(12) United States Patent
Origuchi

(10) Patent No.: US 8,638,365 B2
(45) Date of Patent: Jan. 28, 2014

(54) CAMERA APPARATUS

(75) Inventor: Yohta Origuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 706 days.

(21) Appl. No.: 12/561,372

(22) Filed: Sep. 17, 2009

(65) Prior Publication Data

US 2010/0066831 A1 Mar. 18, 2010

(30) Foreign Application Priority Data

Sep. 18, 2008 (JP) ................. P2008-238992

(51) Int. Cl.
*H04N 7/18* (2006.01)

(52) U.S. Cl.
USPC ............ 348/143; 348/240.3; 348/345

(58) Field of Classification Search
USPC ......... 348/146, 151, 36, 37, 54, 74, 136, 137, 348/240.99, 240.3, 143, 145, 345, 347, 348/E05.045, E07.085
See application file for complete search history.

(56) References Cited

U.S. PATENT DOCUMENTS

| | | | | |
|---|---|---|---|---|
| 4,959,722 A * | 9/1990 | Takanashi et al. | ............. | 386/225 |
| 5,003,385 A * | 3/1991 | Sudo | .............................. | 348/49 |
| 5,557,358 A * | 9/1996 | Mukai et al. | .................... | 396/296 |
| 5,587,766 A * | 12/1996 | Kawamura et al. | ........... | 396/257 |
| 5,682,564 A * | 10/1997 | Tsuboi | .......................... | 396/378 |
| 5,973,726 A * | 10/1999 | Iijima et al. | ..................... | 348/38 |
| 6,317,564 B1 * | 11/2001 | Ichino et al. | ..................... | 396/85 |
| 7,362,513 B2 * | 4/2008 | Kim et al. | ...................... | 359/704 |
| 8,248,517 B2 * | 8/2012 | Shibagami et al. | ........... | 348/345 |
| 2005/0068484 A1 * | 3/2005 | Choo et al. | ..................... | 349/144 |
| 2008/0291320 A1 * | 11/2008 | Omiya et al. | .................. | 348/345 |
| 2009/0122421 A1 * | 5/2009 | Sakamoto et al. | ............. | 359/700 |
| 2009/0153985 A1 * | 6/2009 | Nagaoka et al. | .............. | 359/733 |
| 2009/0322927 A1 * | 12/2009 | Ito et al. | ......................... | 348/335 |
| 2010/0194931 A1 * | 8/2010 | Kawaguchi et al. | ..... | 348/240.99 |
| 2011/0141340 A1 * | 6/2011 | Yumiki et al. | ................. | 348/345 |
| 2013/0113983 A1 * | 5/2013 | Yumiki | ......................... | 348/345 |

FOREIGN PATENT DOCUMENTS

| | | |
|---|---|---|
| JP | 8 70398 | 3/1996 |
| JP | 2000 41165 | 2/2000 |
| JP | 2002 271679 | 9/2002 |
| JP | 2003 110895 | 4/2003 |
| JP | 2004 325931 | 11/2004 |
| JP | 2005 227715 | 8/2005 |
| JP | 2007-110472 | 4/2007 |

* cited by examiner

*Primary Examiner* — Lashonda Jacobs
(74) *Attorney, Agent, or Firm* — Frommer Lawrence & Haug LLP; William S. Frommer

(57) ABSTRACT

A camera apparatus includes: a base; an outer case provided on the case for rotation around a first imaginary axis passing the base; an inner case provided on the outer case for rotation around a second imaginary axis extending on a plane intersecting with the first imaginary axis; a camera section incorporated in the inner case and having an image pickup optical system; a first driving section for rotating the outer case; a second driving section for rotating the inner case; and a conversion lens supported on the outer case; the inner case being rotated by the second driving section between a conversion lens use position at which an optical axis of the image pickup optical system is aligned with an optical axis of the conversion lens and a conversion lens non-use range within which an optical path of the image pickup optical system is displaced from the conversion lens.

8 Claims, 25 Drawing Sheets

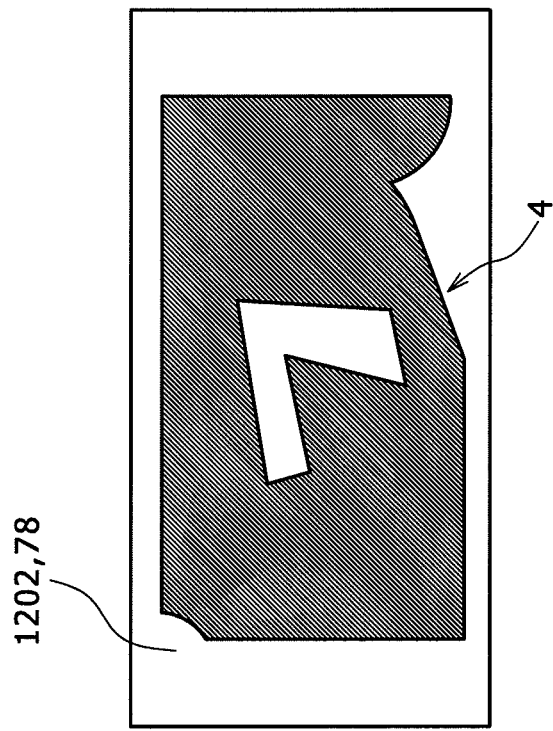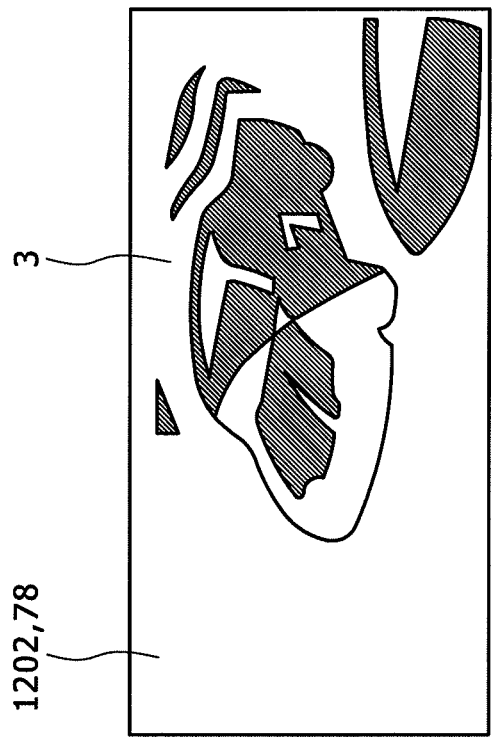

CAMERA APPARATUS

BACKGROUND OF THE INVENTION

1. Field of the Invention

This invention relates to a camera apparatus.

2. Description of the Related Art

A camera apparatus called pan-tilt zoom camera which is attached to the ceiling or a wall of a building or a room is known and disclosed, for example, in Japanese Patent Laid-Open No. 2007-110472.

Such a camera apparatus as just described is connected by a cable to a console installed at a place spaced away from a location where the camera apparatus is attached.

An operation command from the console is supplied through the cable to the camera apparatus so that a panning movement, that is, a horizontal turning movement, a tilting movement, that is, an upward or downward rocking movement or a zooming movement are carried out. Further, image data of an image picked up by the camera apparatus is supplied to a monitor apparatus through the cable so that an image is displayed on the monitor apparatus.

Incidentally, for an image pickup optical system provided in such a camera apparatus as described above, it is demanded to achieve image pickup with a greater angle of view near to the wide angle end and image pickup with a smaller angle of view near to the telephoto end in order to achieve improvement in convenience in use upon image pickup. In other words, increase of the zoom ratio is demanded.

However, in design of an image pickup optical system, there is a limitation to increase of the magnitude of the zoom ratio.

Therefore, a conversion lens is mounted on the image pickup optical system by a manual operation to increase or decrease the angle of field of the image pickup optical system.

Also a camera apparatus has been proposed including an image pickup optical system which uses a very wide angle lens called fish-eye lens and another image pickup optical system which uses a zoom lens of a standard zoom ratio.

SUMMARY OF THE INVENTION

However, in order to mount a conversion lens on an image pickup optical system, a manual operation is required, and this is less advantageous when it is intended to achieve enhancement of the operability.

Further, where two image pickup optical systems are provided, two signal processing sections for a picked up image signal are required. Therefore, there is a disadvantage that increase in size, complication and increase of the cost of the camera apparatus are brought about.

Therefore, it is desirable to provide a camera apparatus which can implement a high zoom ratio with a simple configuration and is superior in convenience in use.

According to the present embodiment, there is provided a camera apparatus including a base, an outer case provided on the case for rotation around a first imaginary axis which passes the base, an inner case provided on the outer case for rotation around a second imaginary axis extending on a plane intersecting with the first imaginary axis, and a camera section incorporated in the inner case and having an image pickup optical system. The camera apparatus further includes a first driving section for rotating the outer case, a second driving section for rotating the inner case, and a conversion lens supported on the outer case. The inner case is rotated by the second driving section between a conversion lens use position at which an optical axis of the image pickup optical system is aligned with an optical axis of the conversion lens and a conversion lens non-use range within which an optical path of the image pickup optical system is displaced from the conversion lens.

In the camera apparatus, if the inner case is rotated until it is positioned at the conversion lens use position at which the optical axis of the image pickup optical system is aligned with the optical axis of the conversion lens, then image pickup can be carried out using the conversion lens. On the other hand, if the inner case is rotated until is positioned in the conversion lens non-use range in which the optical path of the image pickup optical system is displaced from the conversion lens, then image pickup can be carried out using only the image pickup optical system.

Therefore, the camera apparatus is superior in that a high zoom ratio can be implemented with a simple configuration and the convenience in use is favorable.

BRIEF DESCRIPTION OF THE DRAWINGS

FIGS. 26A and 26B and FIGS. 27A and 27B are schematic views illustrating operation of a touch panel of the camera apparatus of FIG. 25.

Figure 1:
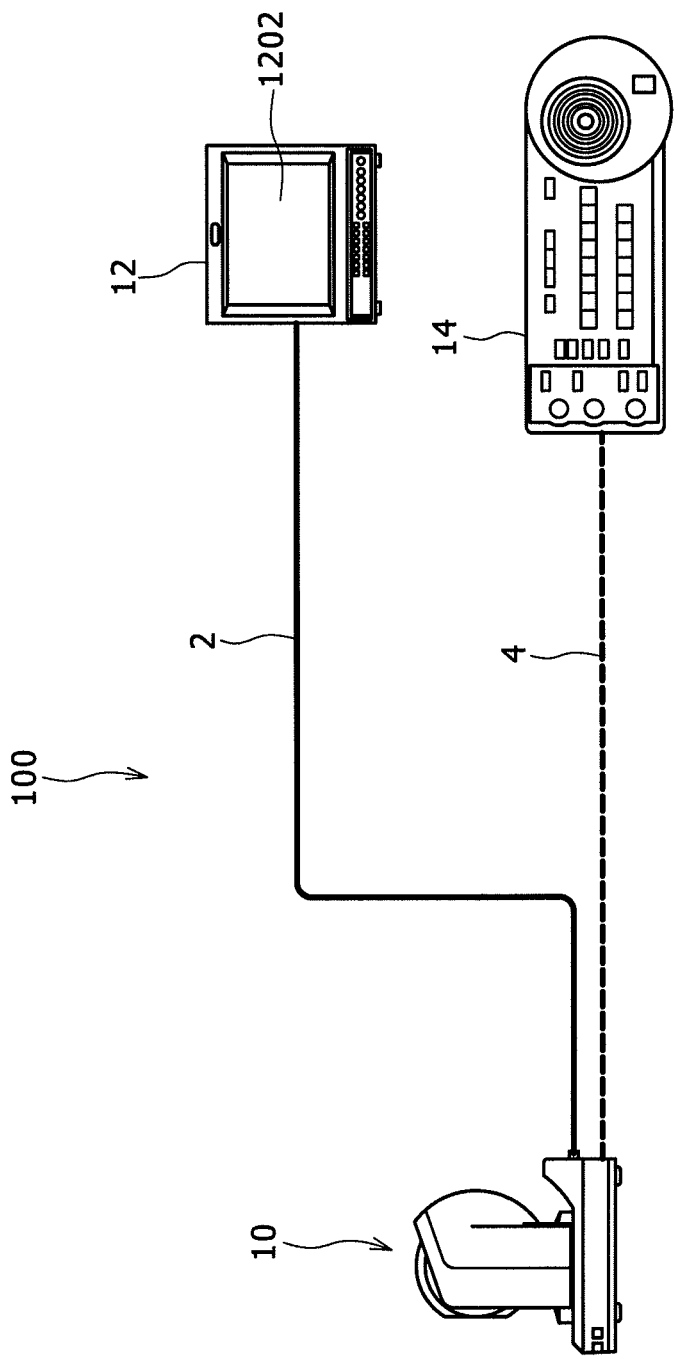
FIG. 1 is a schematic view showing a camera system which includes a camera apparatus according to a first embodiment of the present invention.

DETAILED DESCRIPTION OF THE PREFERRED EMBODIMENTS (First Embodiment)

Now, embodiments of the present invention will be described in detail below, referring to the drawings.

Referring first to FIG. 1, there is shown a camera system which includes a camera apparatus to which the present invention is applied. The camera apparatus 10 is connected to a monitor 12 and a remote controller 14 so that it is remotely controlled. The camera apparatus 10, the monitor 12 and the remote controller 14 compose the camera system 100.

The monitor 12 receives a video signal picked up by the camera apparatus 10 and supplied thereto from the camera apparatus 10 through a cable 2 to display an image on a display screen 1202 thereof.

The remote controller 14 supplies an operation signal to the camera apparatus 10 through another cable 4 to remotely control the camera apparatus 10.

Figure 2:
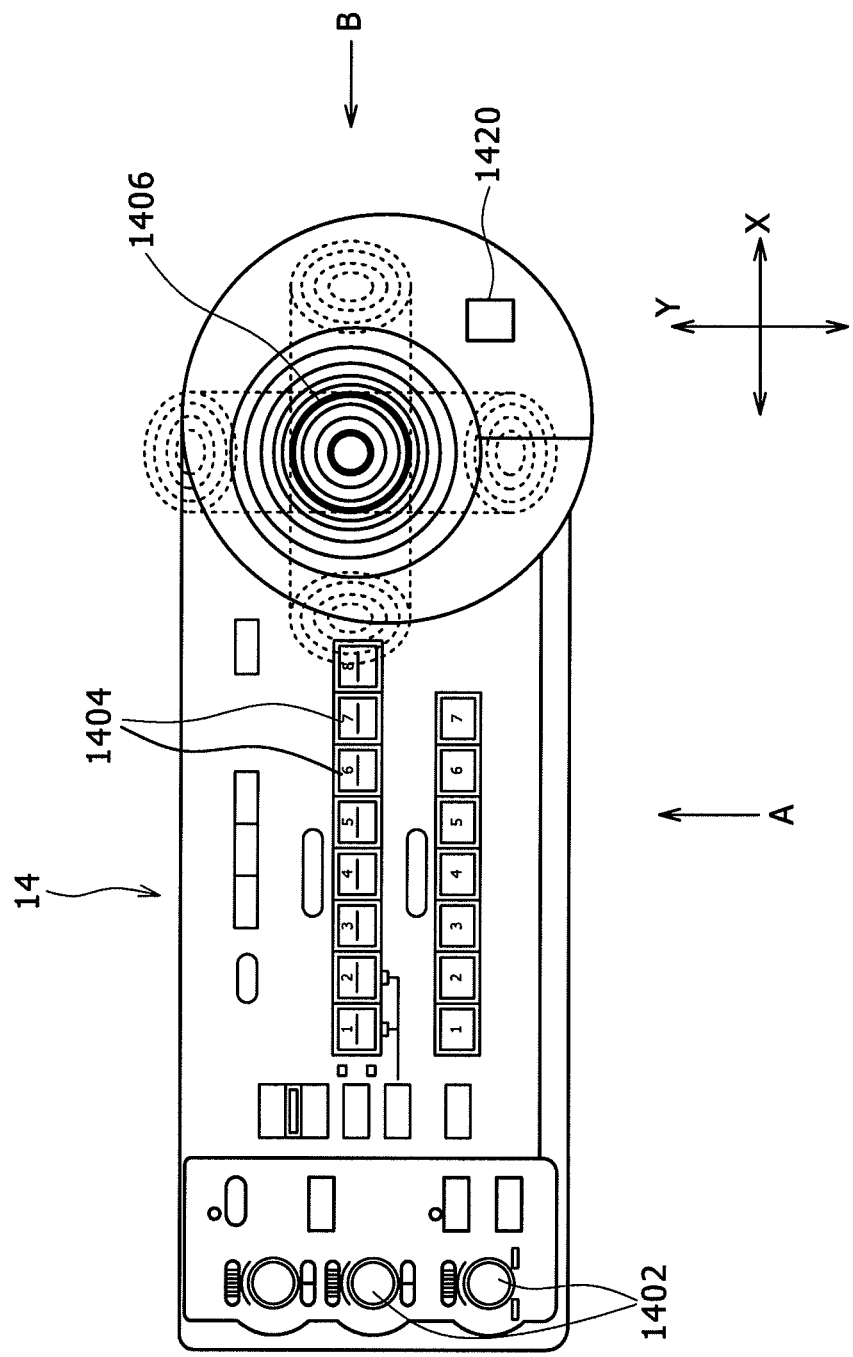
FIG. 2 is a plan view of a remote controller used in the camera system.
Figure 3:
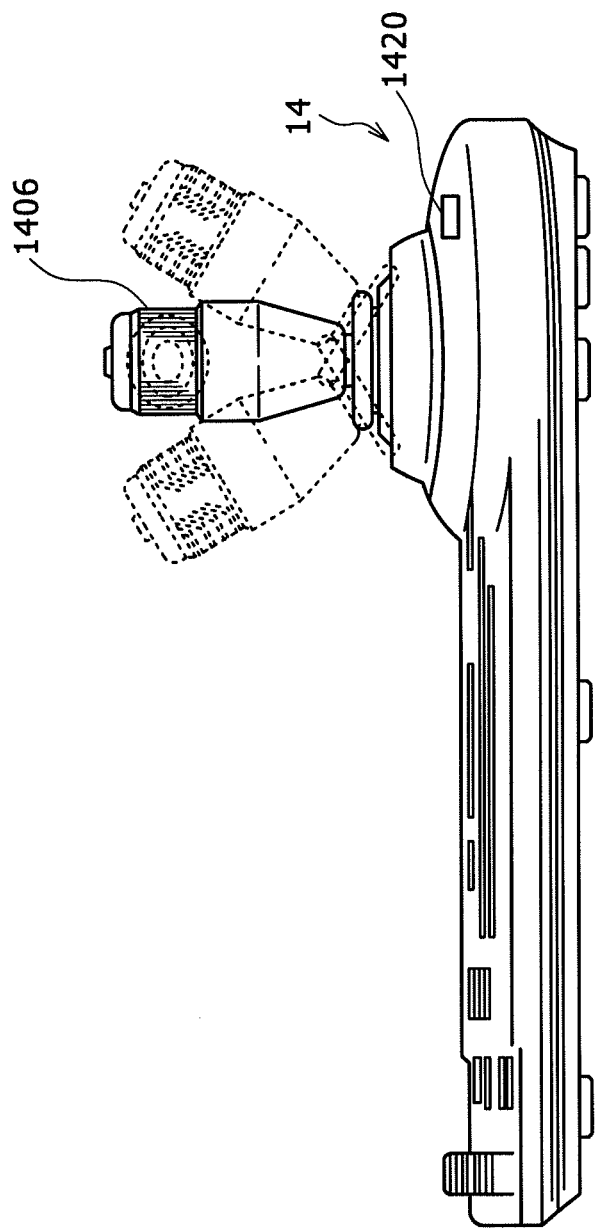
FIGS. 3 and 4 are views as viewed in the directions of arrow marks A and B of FIG. 2, respectively.
Figure 4:
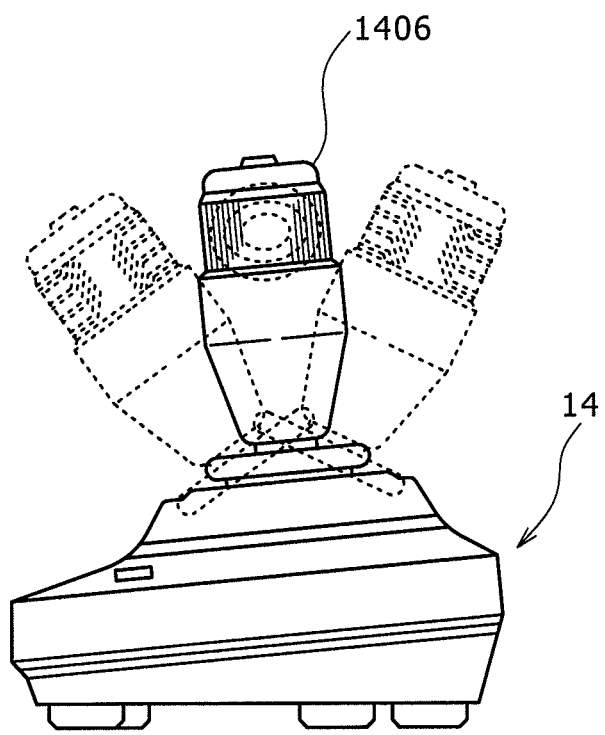

The remote controller 14 is particularly shown in FIGS. 2 to 4. Referring to FIGS. 2 to 4, the remote controller 14 includes a plurality of operation members including a plurality of operation knobs 1402, a plurality of operation switches 1404 and a joystick 1406.

If any of the operation members is operated, then the remote controller 14 supplies a corresponding operation signal to the camera apparatus 10.

Here, an operation of any of the operation members is a rotating operation of any operation knobs 1402, a depression operation of any operation switch 1404 or a rotating operation and/or a rocking operation of the joystick 1406.

Now, the camera apparatus 10 is described with reference to FIGS. 5 to 18.

Figure 5:
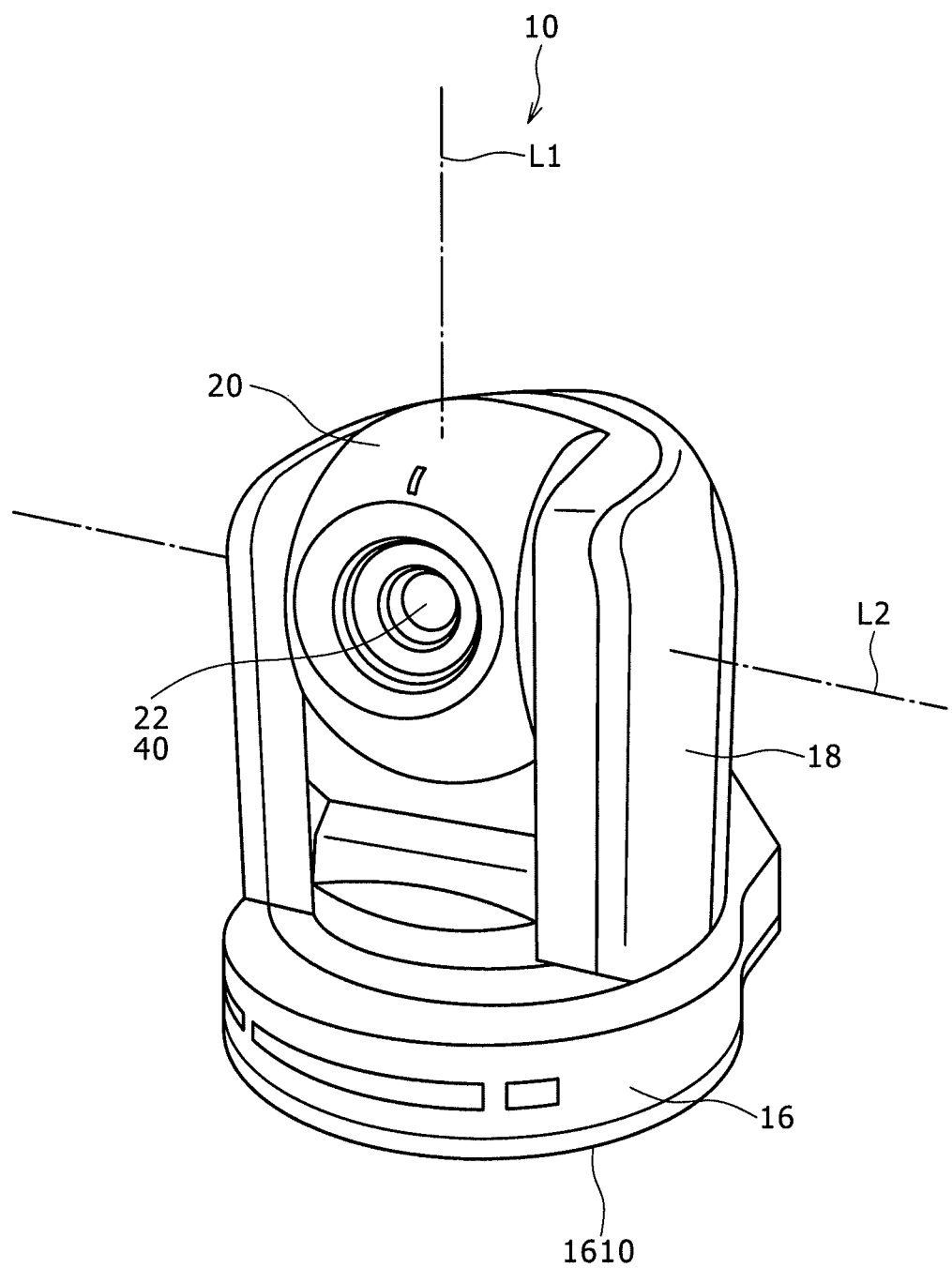
FIG. 5 is a perspective view of the camera apparatus.
Figure 10:
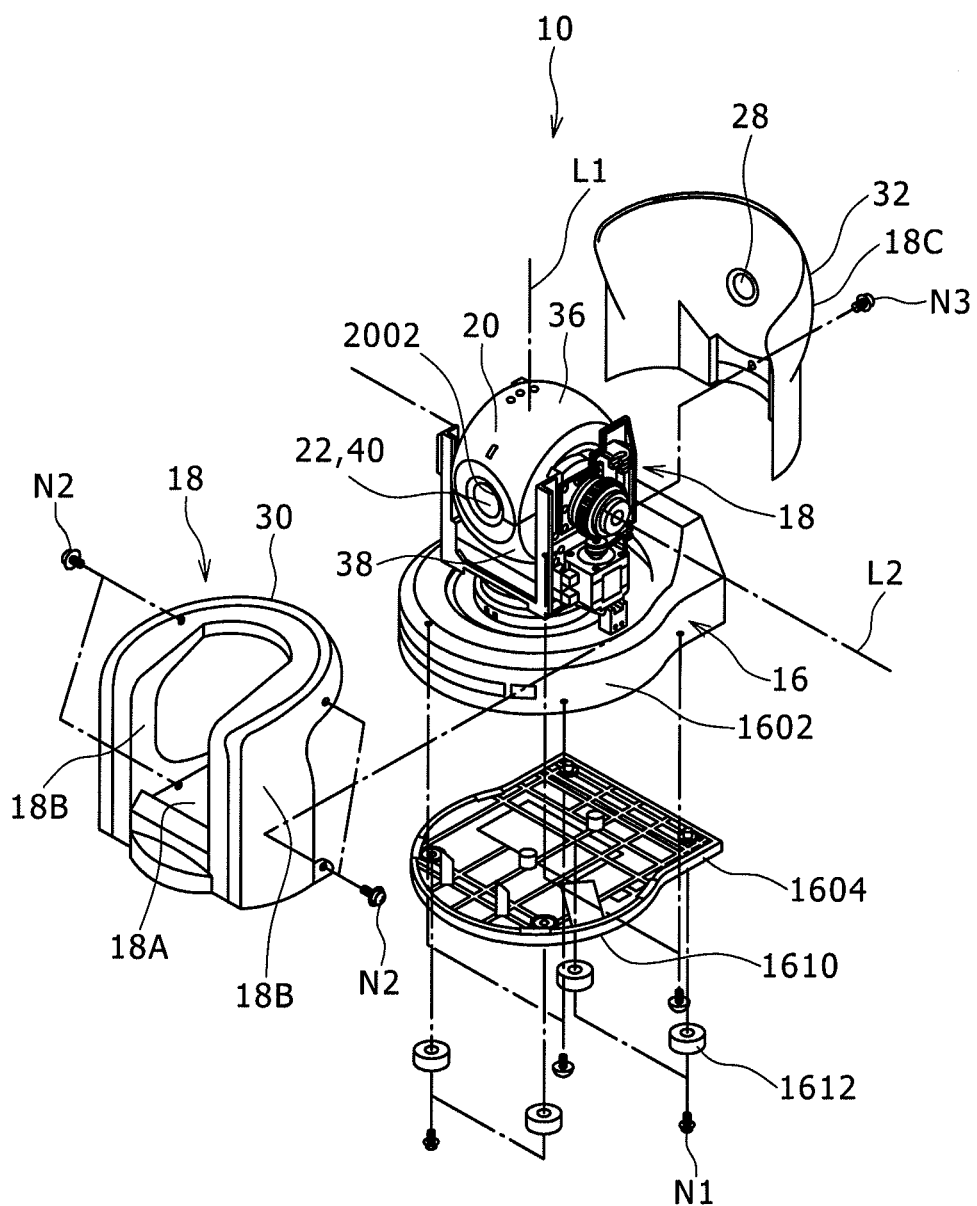
FIG. 10 is an exploded perspective view of the camera apparatus.

Referring first to FIG. 5, the camera apparatus 10 includes a base 16, an outer case 18, an inner case 20, a camera section 22, a first driving section 24 (FIG. 14), a second driving section 26 (FIG. 12) and a conversion lens 28 (FIG. 10).

The outer case 18 is supported for rotation on the base 16 around a first imaginary axis L1 which passes the base 16.

The inner case 20 is mounted for rotation on the inner side of an upper portion of the outer case 18 around a second imaginary axis L2 extending on a plane intersecting with the first imaginary axis L1, in the present embodiment, on a plane perpendicular to the first imaginary axis L1.

The camera section 22 is accommodated in the inner case 20.

The camera apparatus 10 is used, for example, with a bottom face 1610 of the base 16 thereof attached to a mounting face such as an upper face of a table or a ceiling face. In this instance, the first imaginary axis L1 extends in the vertical direction while the second imaginary axis L2 extends in a horizontal direction.

(Base 16)

Referring to FIG. 10, the base 16 includes a flattened base body 1602 and a bottom plate 1604. The base body 1602 has a height, a leftward and rightward width of a dimension greater than that of the height and a forward and backward length of a dimension greater than that of the width. The bottom plate 1604 is attached to a lower face of the base body 1602 by screws N1 and forms the bottom face 1610 of the base 16.

Rubber legs 1612 are provided at four corners of the bottom face 1610 of the base 16.

Figure 9:
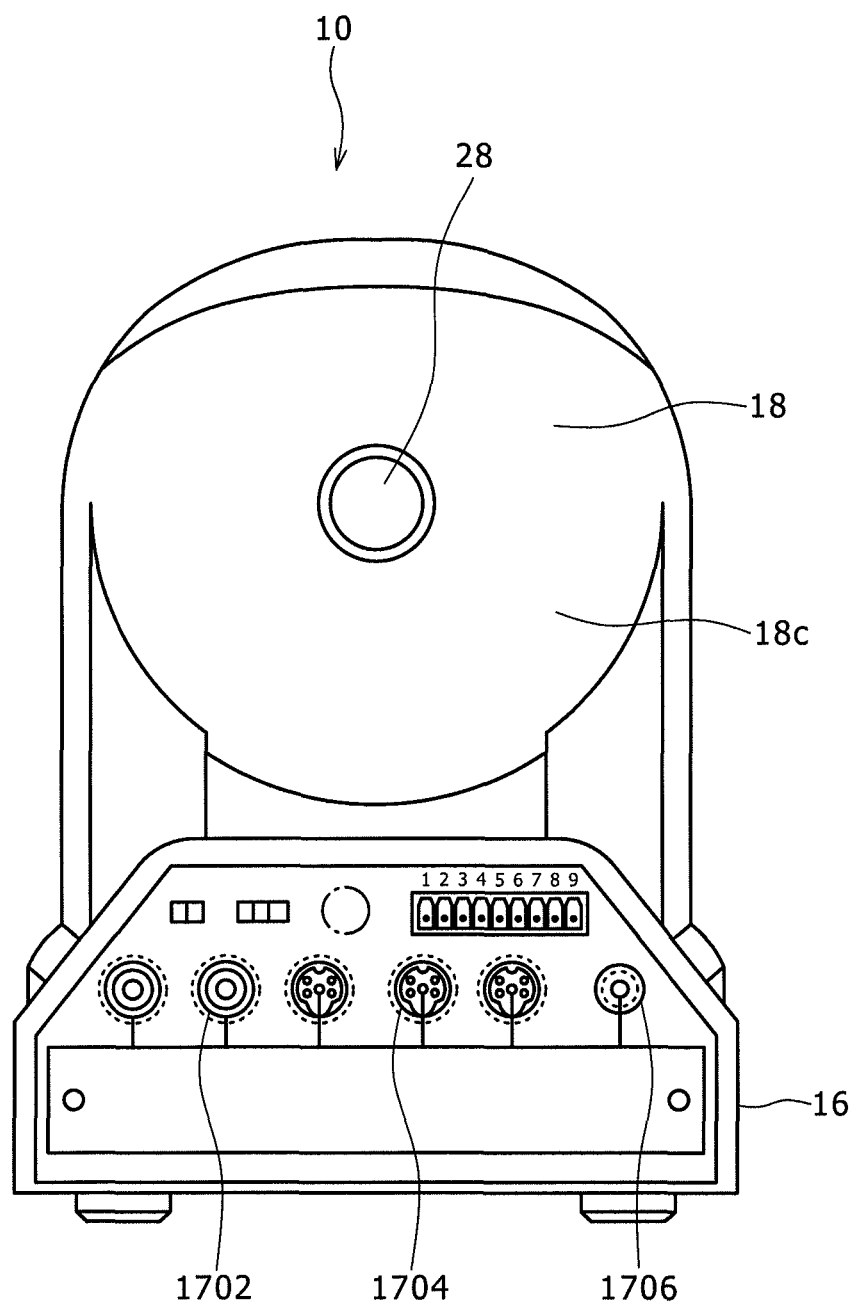
FIG. 9 is a view as viewed in the direction of an arrow mark C of FIG. 7.

Referring now to FIG. 9, a plurality of connection terminals including a video terminal 1702, a communication terminal 1704 and a power supply input terminal 1706 are provided on a rear face of the base 16.

The video terminal 1702 is connected to the monitor 12 (FIG. 1) by the cable 2 to supply a video signal to the monitor 12.

The communication terminal 1704 is connected to the remote controller 14 (FIG. 1) by the cable 4 to transfer a control signal to and from the remote controller 14 based on predetermined interface specifications.

The power supply input terminal 1706 receives a dc power supply through a power supply cable not shown.

(Outer Case 18)

Figure 7:
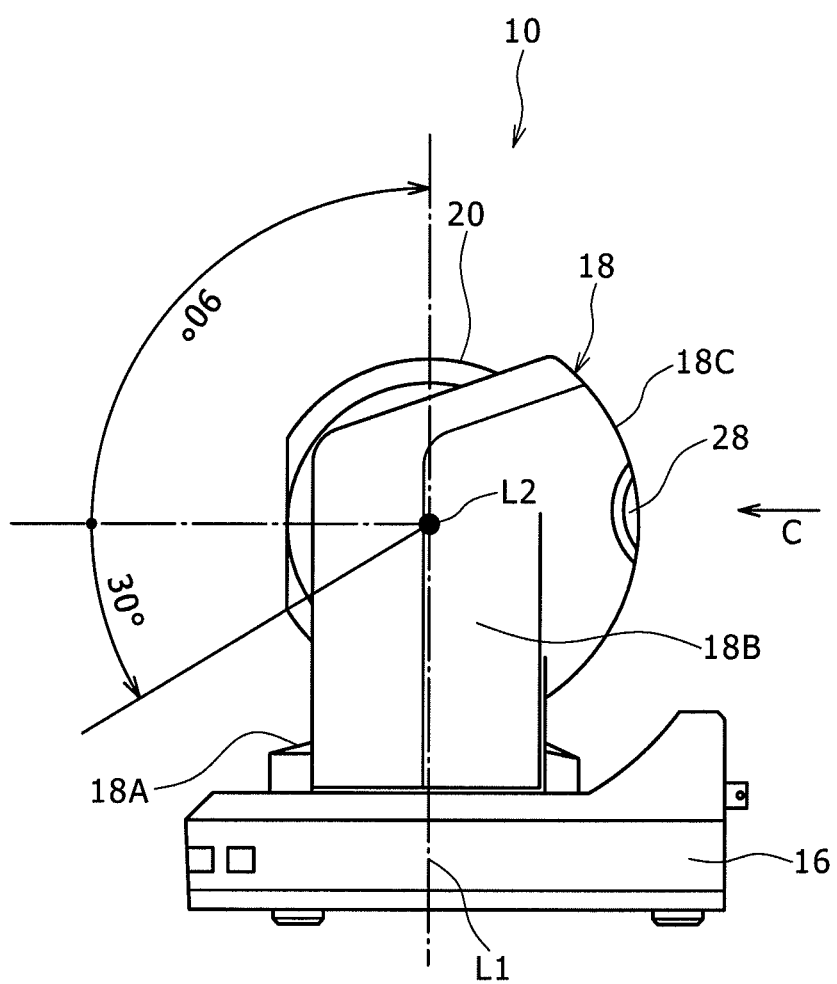
FIGS. 7 and 8 are views as viewed in the directions of arrow marks A and B of FIG. 6, respectively.

Referring to FIG. 7, the outer case 18 includes a base portion 18A opposing to the base 16, a pair of left and right side portions 18B erected uprightly from the opposite left and right sides of the base portion 18A, and a rear portion 18C for connecting rear races of the left and right side portions 18B to each other.

Referring to FIG. 10, in the present embodiment, the base portion 18A and an upper portion of the rear portion 18C are integrated to form a front segment 30.

Meanwhile, the remaining portion of the rear portion 18C except the upper portion is formed as a rear segment 32.

In other words, the outer case 18 is composed of two members of the front segment 30 and the rear segment 32.

Figure 11:
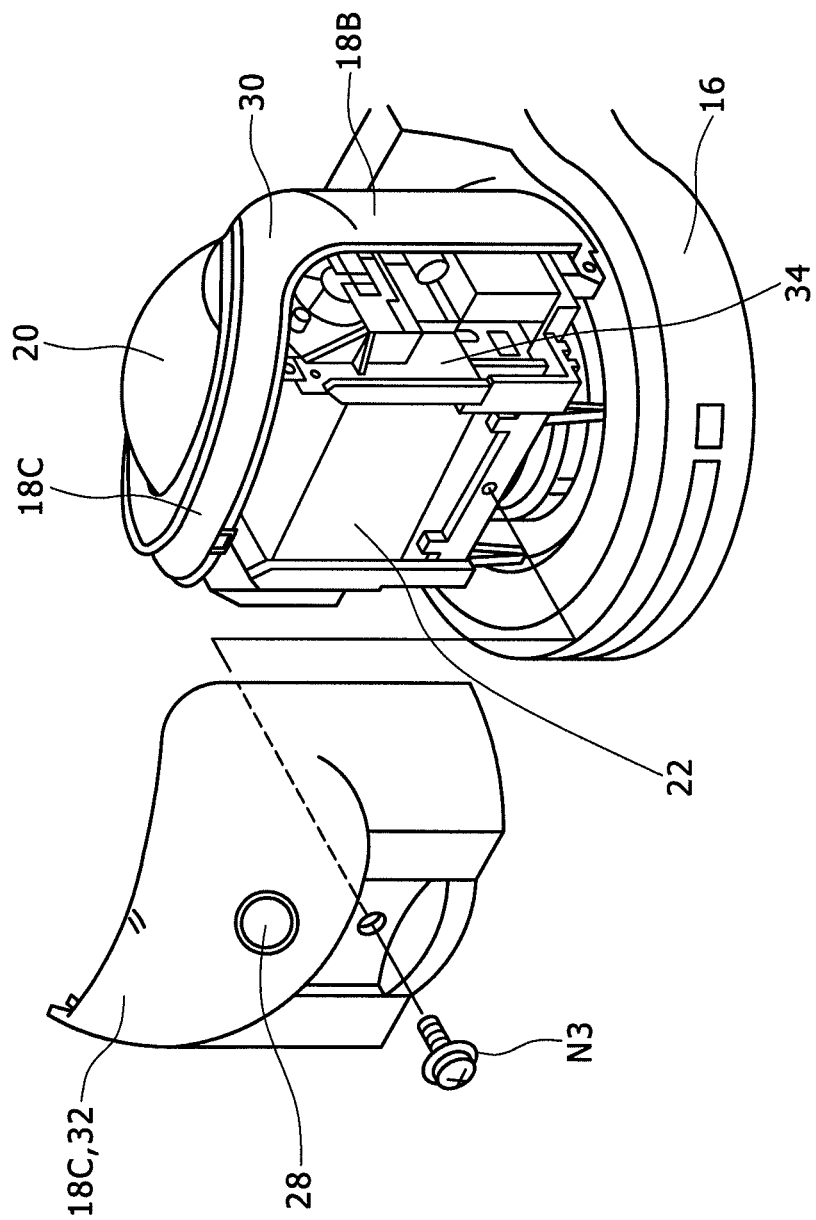
FIG. 11 is a perspective view of the camera apparatus with a rear segment removed.

Referring to FIG. 11, the outer case 18 is attached to a frame 34 such that it is disposed on the base 16.

Figure 13:
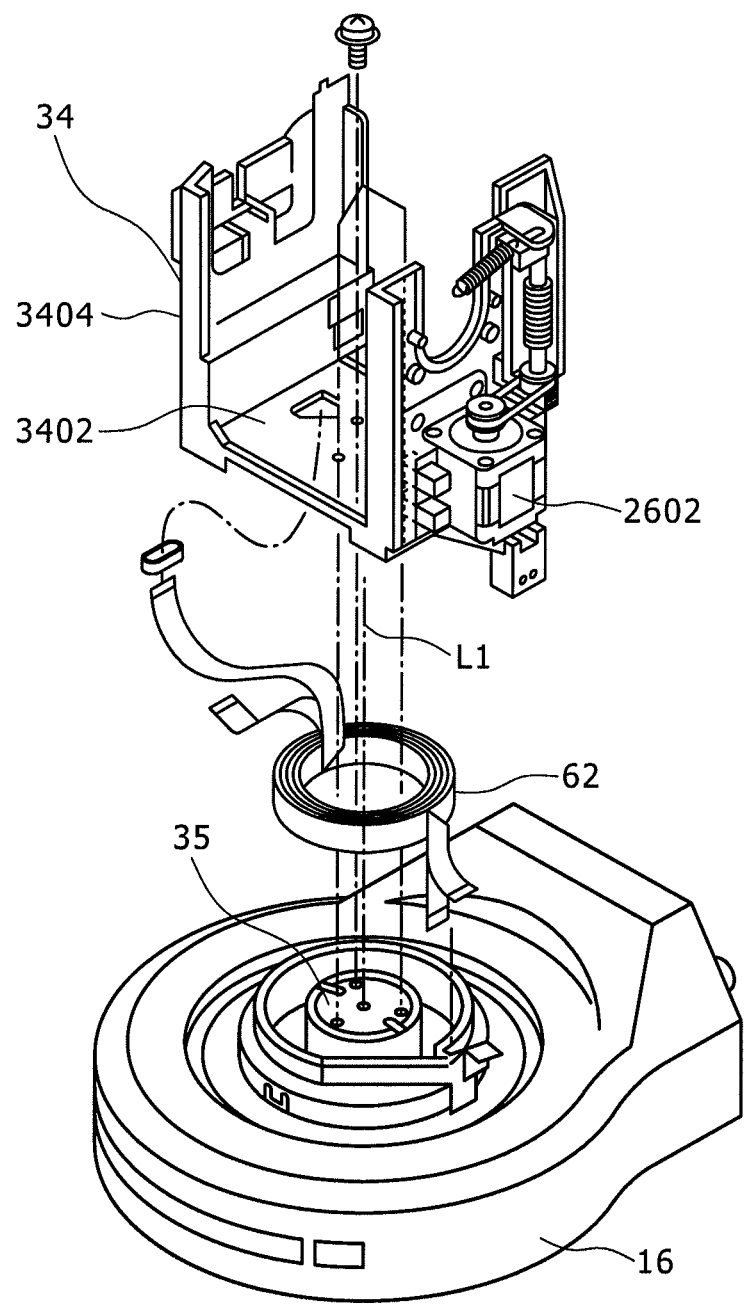
FIG. 13 a perspective view of the outer case, the base and a lead wire of the camera apparatus.

Referring to FIG. 13, the frame 34 is mounted for rotation on the base 16 around the first imaginary axis L1 through a bearing mechanism 35.

Figure 12:
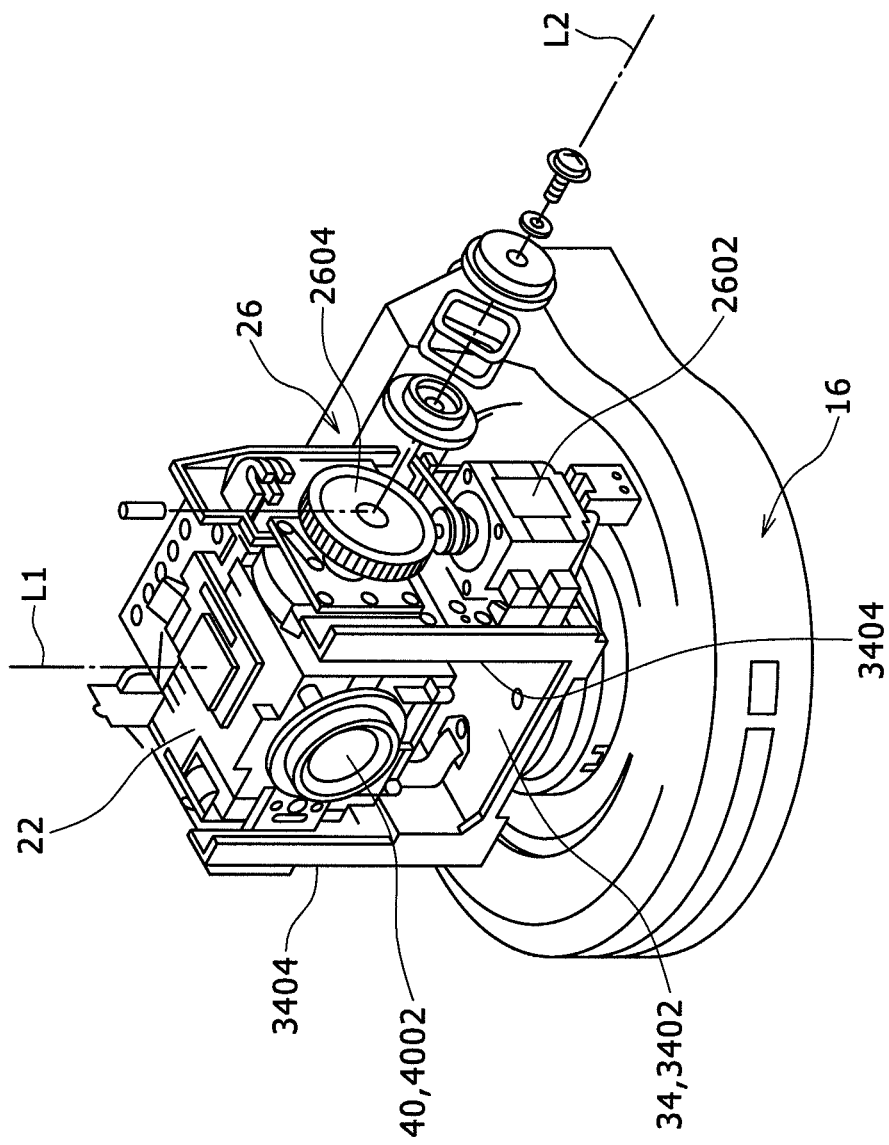
FIG. 12 is a perspective view showing the base, an outer case and an inner case of the camera apparatus.

Referring to FIG. 12, the frame 34 includes a base plate portion 3402 extending on the base 16 and a pair of side plate portions 3404 erected uprightly from the opposite sides of the base plate portion 3402.

Referring to FIGS. 10, 11 and 12, the outer case 18 is attached to the frame 34 by screws N2 and N3 such that it covers the base plate portion 3402 with the base portion 18A thereof, covers the side plate portions 3404 on the opposite sides with the left and right side portions 18B and covers a rear portion between the side plate portions 3404 on the opposite sides with a rear portion 18C thereof.

(Inner Case 20)

Referring to FIG. 10, the inner case 20 is composed of two members including an upper segment 36 opposing to the base 16 and a lower segment 38 opposing to the opposite side to the base 16.

The inner case 20 is attached to the camera section 22 by screws not shown such that it covers an upper portion of the camera section 22 with the upper segment 36 thereof between the left and right side plate portions 3404 of the frame 34 and covers a lower portion of the camera section 22 with the lower segment 38 thereof.

In particular, the inner case 20 is attached to the camera section 22 shown in FIG. 12 such that it is disposed between upper portions of the left and right side portions 18B of the outer case 18. In other words, the camera section 22 is incorporated in the inner case 20 and covered with the inner case 20, and the inner case 20 moves integrally with the camera section 22.

Figure 6:
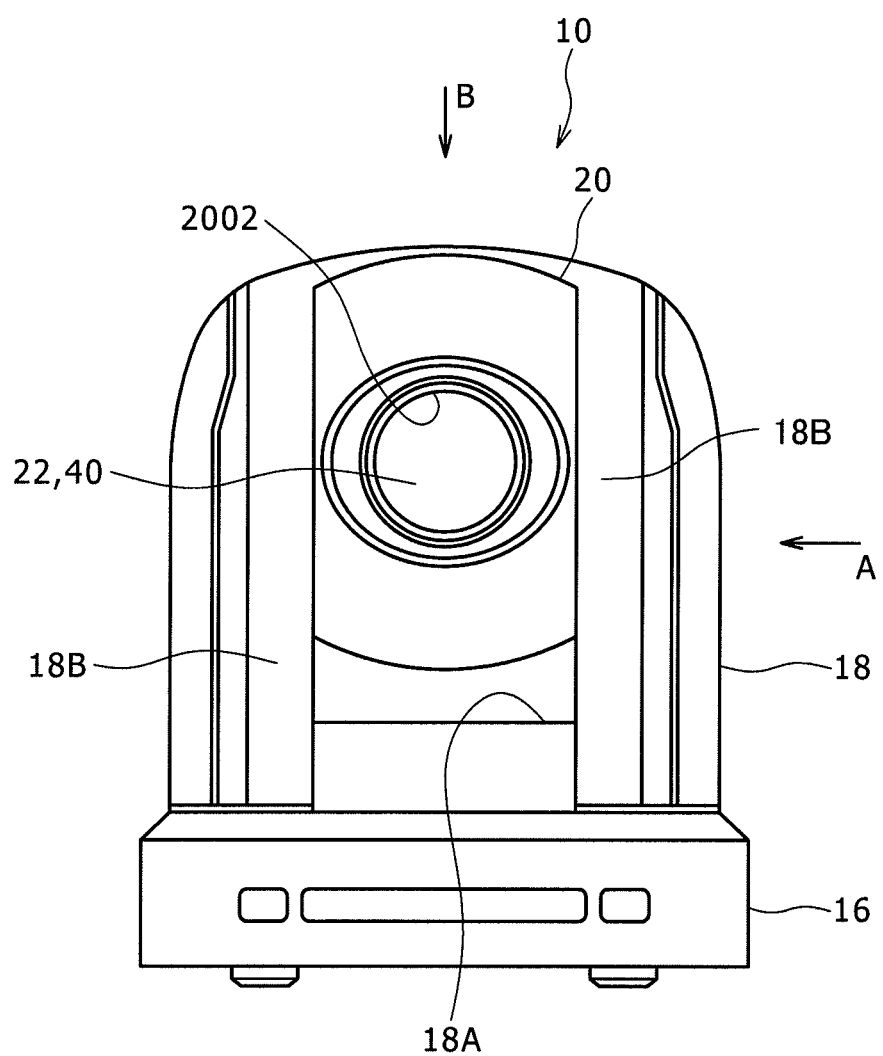
FIG. 6 is a front elevational view of the camera apparatus.

Referring to FIG. 6, the inner case 20 has an opening 2002 formed therein such that, when the inner case 20 is attached to the camera section 22, an image pickup optical system 40 of the camera section 22 is exposed to the outside through the opening 2002. The opening 2002 is positioned at the center between the left and right side portions 18B.

(Camera Section 22)

Referring to FIG. 12, the camera section 22 is disposed between the left and right side plate portions 3404 of the frame 34 and coupled at the opposite end portions thereof for rotation around the second imaginary axis L2 on the left and right side plate portions 3404.

Figure 15:
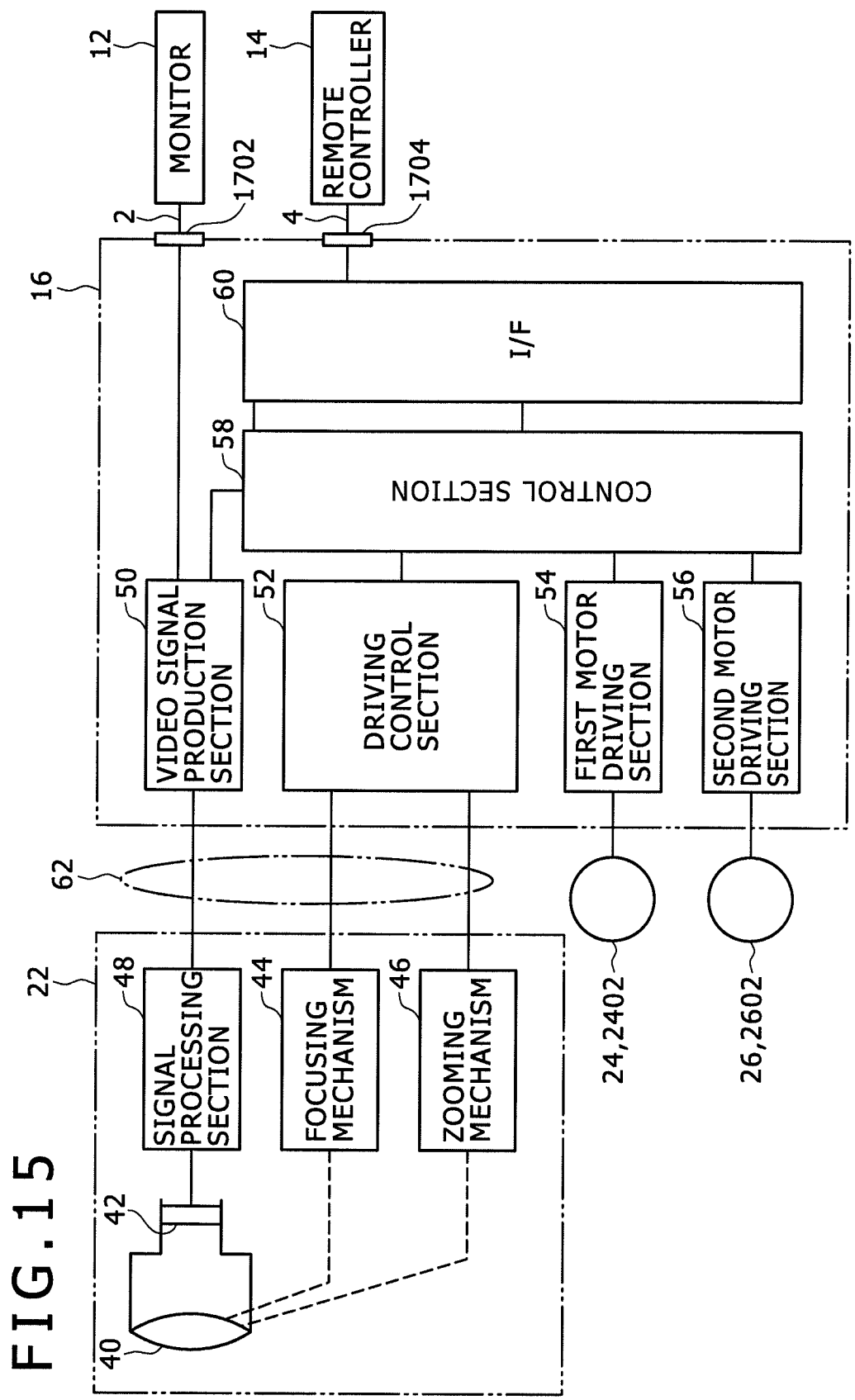
FIG. 15 is a block diagram showing a configuration of a control system of the camera apparatus.

Referring to FIG. 15, the camera section 22 includes the image pickup optical system 40 for catching an image of an image pickup object, and an image pickup device 42 for picking up an image of the image pickup object introduced by the image pickup optical system 40 to produce a picked up image signal.

An objective lens 4002 (FIG. 12) is positioned on the side of the image pickup optical system 40 nearest to the image pickup object.

The image pickup optical system 40 includes a focusing mechanism 44 for moving a focusing lens of the image pickup optical system 40 to carry out a focusing movement and a zooming mechanism 46 for moving a zoom lens of the image pickup optical system 40 to carry out a zooming movement.

In the present embodiment, the image pickup optical system 40 has a zoom ratio of one to 20 times.

Further, the camera section 22 includes a signal processing section 48 for carrying out a predetermined signal process for a picked up image signal to produce a video signal.

(First Driving Section 24)

Figure 14:
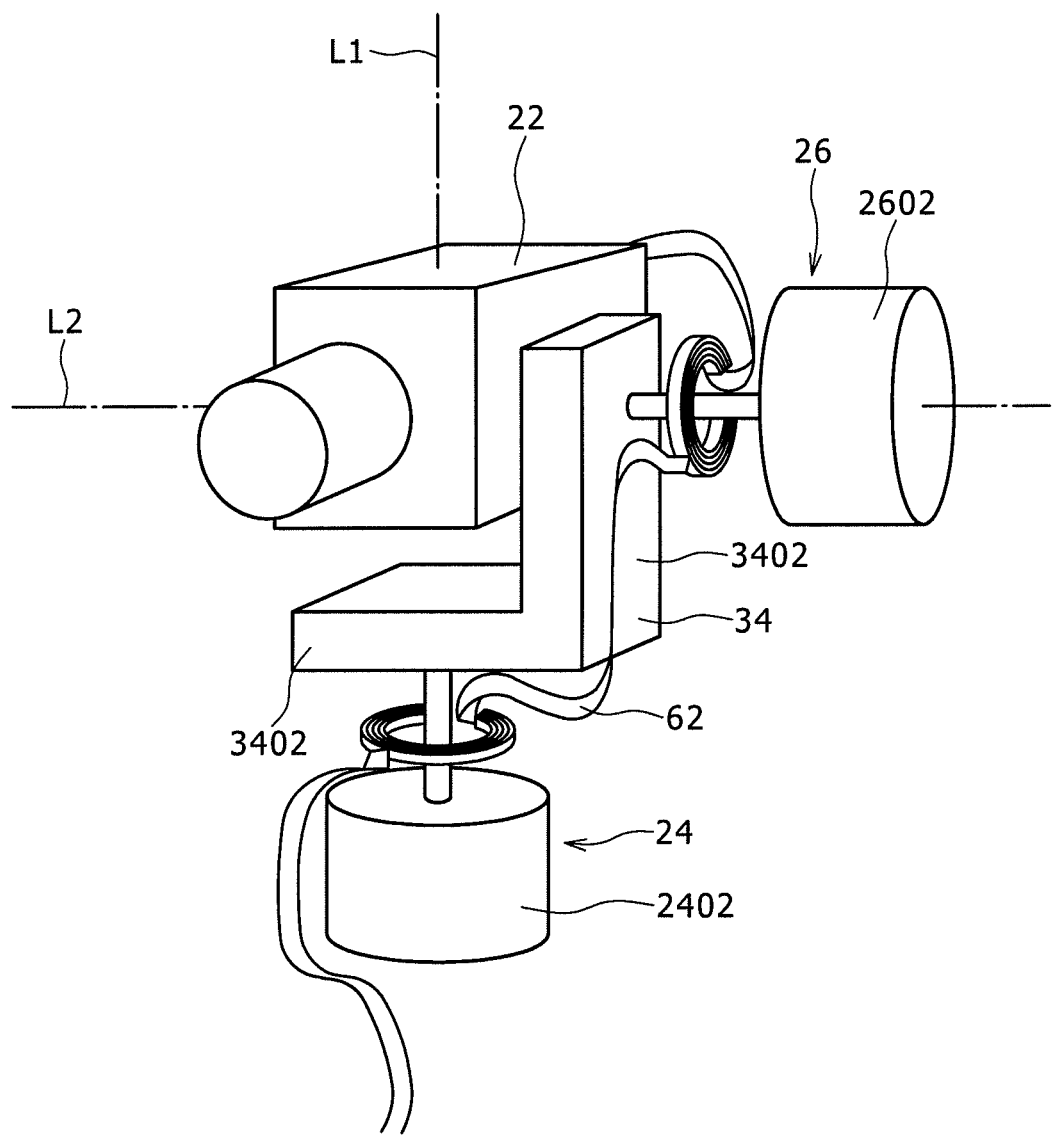
FIG. 14 is a perspective view showing a configuration of first and second driving sections of the camera apparatus.

Referring to FIG. 14, the first driving section 24 rotates the frame 34 around the first imaginary axis L1 with respect to the base 16 to rotate the base 16 around the first imaginary axis L1, that is, to turn the base 16 in a panning direction.

The first driving section 24 includes, for example, a first motor 2402, a transmission mechanism not shown for transmitting rotational driving force of the first motor 2402 to the frame 34, and so forth. Various existing known mechanisms including a gear mechanism or an endless belt can be adopted for such a transmission mechanism as just described.

The first motor 2402 and the transmission mechanism which compose the first driving section 24 are accommodated in the inside of the base 16.

(Second Driving Section 26)

Referring to FIG. 14, the second driving section 26 rotates the camera section 22 around the second imaginary axis L2 with respect to the frame 34 to rotate the inner case 20 around the second imaginary axis L2, that is, to turn the camera section 22 in a tilting direction.

The second driving section 26 includes, for example, a second motor 2602, a transmission mechanism 2604 (FIG. 12) for transmitting rotational driving force of the second motor 2602 to the camera section 22, and so forth. Various existing known mechanisms including a gear mechanism including a worm and a worm wheel, an endless belt or the like can be used for the transmission mechanism 2604.

The second motor 2602 and the transmission mechanism 2604 which compose the second driving section 26 are accommodated in the inside of the inner case 20.

(Control System)

Now, a control system of the camera apparatus 10 is described.

Referring to FIG. 15, a video signal production section 50, a driving control section 52, a first motor driving section 54, a second motor driving section 56, a control section 58, an interface 60 and so forth are provided on the base 16.

The video signal production section 50 carries out various signal processes for a video signal supplied thereto from the signal processing section 48 to produce a video signal of a predetermined format.

Further, in the present embodiment, since the conversion lens 28 is a very wide angle lens, that is, a fish-eye lens, an image picked up when the conversion lens 28 is used suffers from distortion. Accordingly, the video signal production section 50 carries out image processing of correcting such distortion so that a plain image can be displayed on the monitor 12.

The driving control section 52 supplies a driving signal to the focusing mechanism 44 and the zooming mechanism 46 so that the focusing mechanism 44 and the zooming mechanism 46 may operate.

The first motor driving section 54 supplies a driving signal to the first motor 2402 to carry out rotational control of the first motor 2402.

The second motor driving section 56 supplies a driving signal to the second motor 2602 to carry out rotational control of the second motor 2602.

The control section 58 controls the video signal production section 50, driving control section 52, first motor driving section 54 and second motor driving section 56 in accordance with a control signal supplied thereto from the remote controller 14 through the interface 60.

In particular, the control section 58 controls the video signal production section 50 in accordance with a control instruction regarding a video image supplied thereto from the remote controller 14 to carry out starting and stopping of supply of a video signal and various working processes for a video signal.

Further, the control section 58 controls the driving control section 52 in accordance with a control instruction regarding a focusing operation or a zooming operation supplied thereto from the remote controller 14.

Furthermore, the control section 58 controls the first motor driving section 54 and the second motor driving section 56 in accordance with a control signal regarding a panning movement or a tilting movement supplied thereto from the remote controller 14.

The interface 60 carries out communication control between the control section 58 and the remote controller 14 in accordance with a predetermined communication protocol.

The video signal supplied from the video signal production section 50 is provided to the monitor 12.

Lead wires 62 transmit a video signal, a driving signal, power and so forth between the camera section 22 and the base 16 therethrough.

In the present embodiment, the lead wires 62 are formed from a flexible cable as seen in FIGS. 13 and 14.

(Conversion Lens 28)

Referring to FIGS. 7, 9, 10 and 11, the conversion lens 28 is provided at an upper portion of the rear segment 32.

The conversion lens 28 functions while it is disposed forwardly of the image pickup optical system 40.

The conversion lens 28 varies the focal distance of the optical system including the image pickup optical system 40 and the conversion lens 28 toward the wide angle end side or the telephoto end side with respect to the focal distance solely of the image pickup optical system 40. In other words, the conversion lens 28 varies the zoom ratio and the angle of view of the optical system where it includes only the image pickup optical system 40.

In the present embodiment, a wide conversion lens is used as the conversion lens 28. More particularly, a very wide angle lens, that is, a fish-eye lens having an optical magnification of 0.24 times and an angle of 180 degrees thereat subtended by a diagonal line of the screen, is used as the conversion lens 28.

Since the zoom ratio of the image pickup optical system 40 is one to 20 times as described hereinabove, the zoom ratio of the entire optical system where the conversion lens 28 is used is 0.24 to approximately four times.

The conversion lens 28 is provided such that, when the camera section 22 rotates around the second imaginary axis L2 together with the inner case 20 until the inner case 20 is positioned at a conversion lens use position, the center of the conversion lens 28 is aligned with the optical axis of the image pickup optical system 40 of the camera section 22.

In the present embodiment, the optical axis of the conversion lens 28 extends perpendicularly to both of the first imaginary axis L1 and the second imaginary axis L2.

Figure 16:
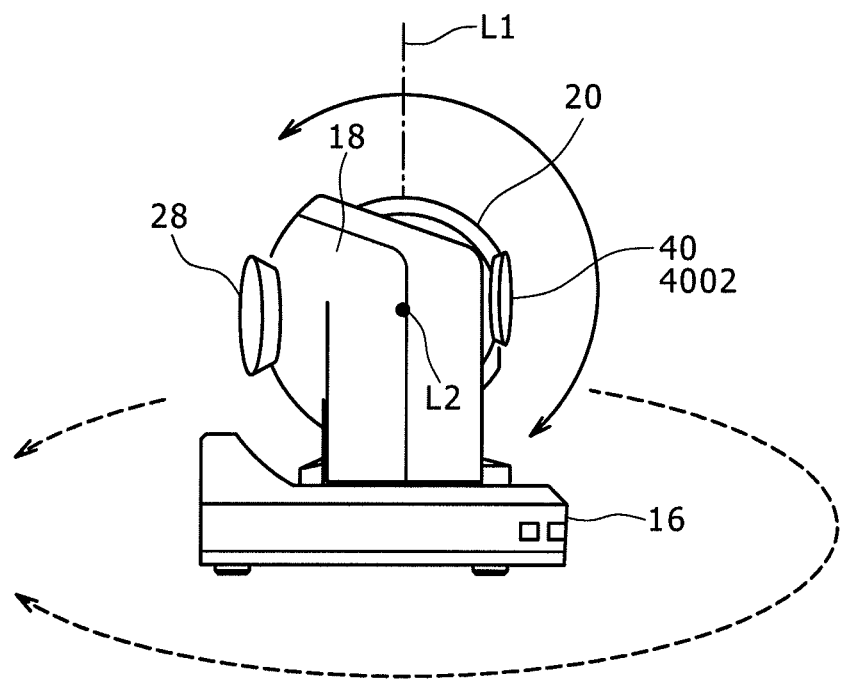
FIG. 16 is a side elevational view of the camera apparatus illustrating a conversion lens non-use range.
Figure 17:
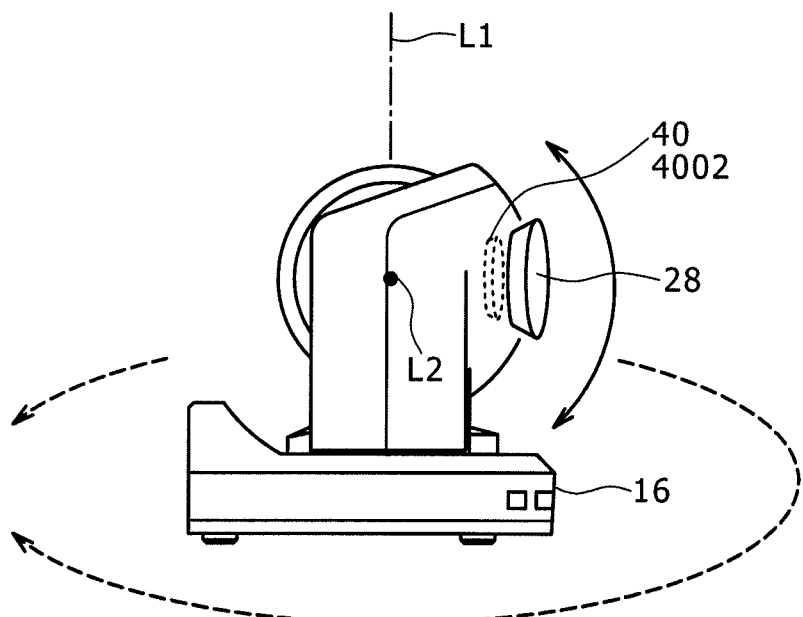
FIG. 17 is a side elevational view of the camera apparatus illustrating a conversion lens use position.

Thus, rotation of the inner case 20 by the second driving section 26 (FIG. 12) is carried out between the conversion lens use position shown in FIG. 17 and a conversion lens non-use range shown in FIG. 16.

(Using Method)

Now, a using method where the remote controller 14 is used to remotely control the camera apparatus 10 is described.

It is to be noted that, in the present embodiment, as seen in FIG. 2, one of the operation switches 1404 of the remote controller 14 is formed as a conversion lens changeover switch 1420 for changing over the conversion lens 28 between a use state and a non-use state.

Accordingly, if the conversion lens changeover switch 1420 is turned on, then the remote controller 14 transmits a control instruction to use the conversion lens to the camera apparatus 10. On the other hand, if the conversion lens changeover switch 1420 is turned off, then the remote controller 14 transmits a control instruction not to use the conversion lens to the camera apparatus 10.

However, if the joystick 1406 is operated to rock in the X direction in FIG. 2, that is, in the leftward or rightward direction, then the remote controller 14 transmits a control instruction to rotate the outer case 18 around the first imaginary axis L1, that is, a panning direction turning instruction, to the camera apparatus 10.

On the other hand, if the joystick 1406 is operated to rock in the Y direction in FIG. 2, that is, in the forward or backward direction, then the remote controller 14 transmits a control instruction to rotate the inner case 20 around the second imaginary axis L2, that is, a tiling direction turning instruction, to the camera apparatus 10.

Further, if the joystick 1406 is operated to rotate in the leftward direction, then the remote controller 14 transmits a control instruction to increase the zoom ratio, that is, to vary the focal distance toward the telephoto end side, that is, a telephoto instruction, to the camera apparatus 10.

However, if the joystick 1406 is operated to rotate in the rightward direction, then the remote controller 14 transmits a control instruction to decrease the zoom ratio, that is, to vary the focal distance toward the wide angle end side, that is, a wide angle instruction, to the camera apparatus 10.

Figure 18:
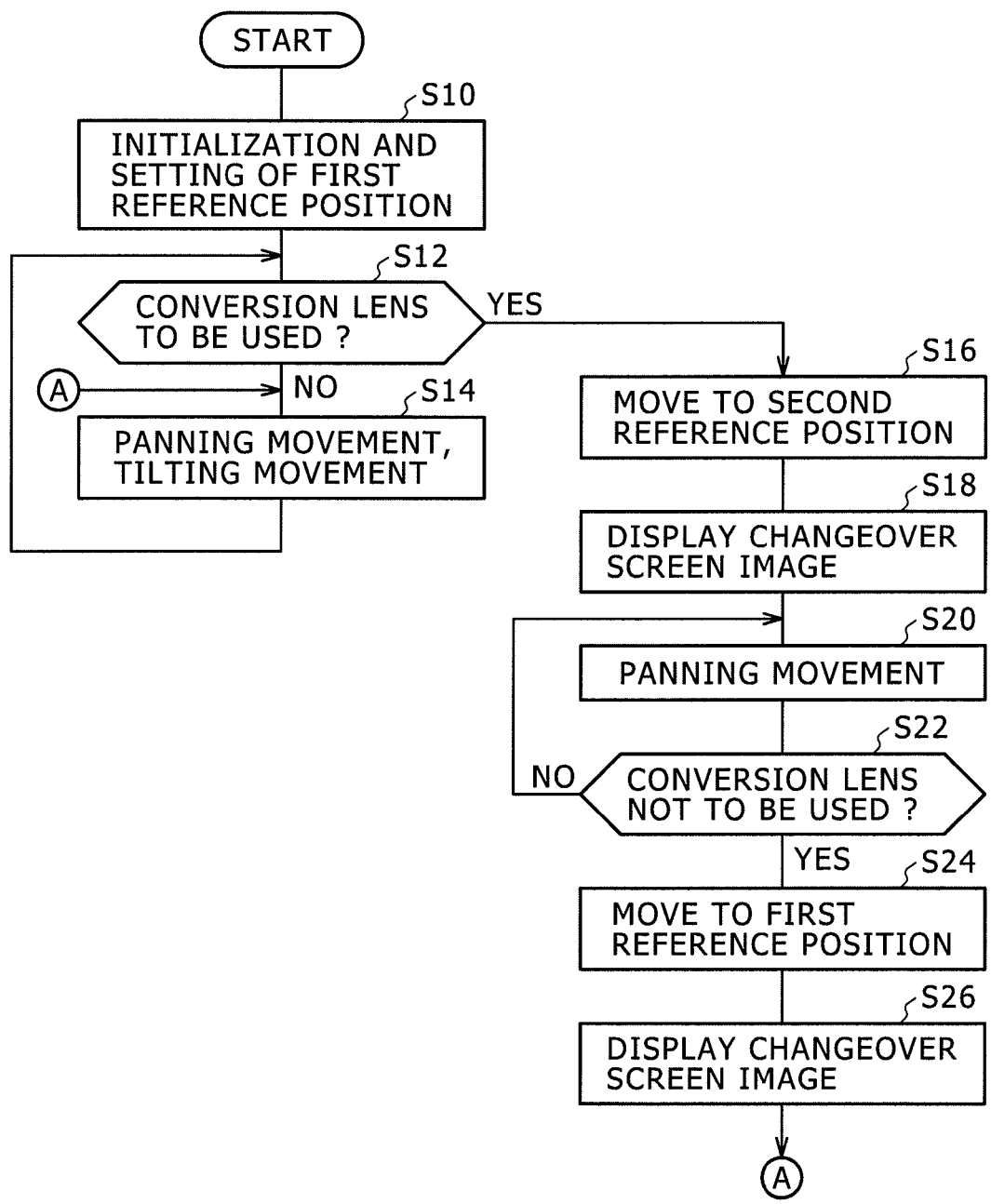
FIG. 18 is a flow chart illustrating operation of the camera apparatus when the remote controller is used to remotely control the camera apparatus.

Referring to FIG. 18, if the power supply to the camera apparatus 10 is made available, then the control section 58 carries out an initialization operation and a reference position setting operation at step S10.

The initialization operation is an operation of initializing the components of the camera apparatus 10 in preparation for starting of operation of the camera apparatus 10. For example, as an initialization operation, the control section 58 controls the focusing mechanism 44 and the zooming mechanism 46 through the driving control section 52 to set the focal position and the zoom ratio of the image pickup optical system 40 to a reference position and a reference zoom ratio determined in advance, respectively.

The first reference position setting operation is an operation of positioning the outer case 18 and the inner case 20 to a first reference position through control of the first driving section 24 and the second driving section 26 by the control section 58.

Figure 8:
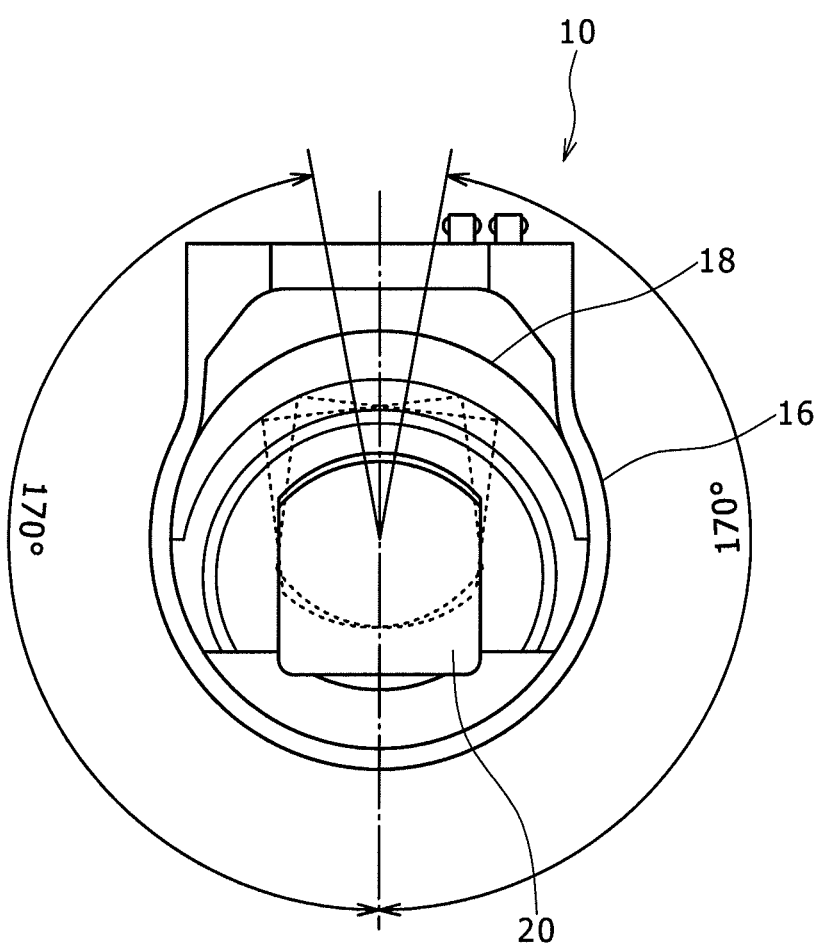

In particular, the first reference position is a position in which the inner case 20 is within the conversion lens non-use range and the optical axis of the image pickup optical system 40 is directed to the front of the base 16 as seen in FIGS. 7 and 8. In the present embodiment, at the first reference position, the optical axis of the image pickup optical system 40 extends on a plane perpendicular to the first imaginary axis L1.

When the inner case 20 is within the conversion lens non-use range, the light path of the image pickup optical system 40 is displaced from the conversion lens 28 and the outer case 18 and the focal distance of the image pickup optical system 40 becomes the focal distance solely of the image pickup optical system 40 except the conversion lens 28. In other words, the zoom ratio and the angle of view of the image pickup optical system 40 are given by the zoom ratio and the angle of view solely of the image pickup optical system 40.

Then, the control section 58 decides whether or not a control instruction to use the conversion lens 28 is received from the remote controller 14 at step S12.

If the result of the decision at step S12 is in the negative "N" (No), then the control section 58 controls the first driving section 24 and the second driving section 26 in accordance with a panning direction turning instruction and a tilting direction turning instruction supplied thereto from the remote controller 14 in response to an operation of the joystick 1406, respectively. Consequently, the outer case 18 and the inner case 20 are rotated around the first and second imaginary axes L1 and L2 to carry out a panning operation and a tiling operation as seen in FIG. 16 at step S14, respectively.

It is to be noted that, in the present embodiment, in a state wherein the inner case 20 is positioned in the conversion lens non-use range, the outer case 18 rotates over a range of 350 degrees around the first imaginary axis L1. More particularly, the outer case 18 rotates over a range of 175 degrees in each of the left and rightward directions from the first reference position.

Further, in the present embodiment, the inner case 20 rotates over a range of 30 degrees downwardly from the first reference position and over a range of 90 degrees upwardly from the first reference position.

It is to be noted that, although the range or rotation of the inner case 20 around the second imaginary axis L2 is not limited particularly, the inner case 20 may be rotated to a position at which the objective lens 4002 of the image pickup optical system 40 is opposed to the base portion 18A of the outer case 18, or in other words, by 90 degrees downwardly from the first position.

By the configuration just described, since the objective lens 4002 is covered with the base portion 18A, the objective lens 4002 can be advantageously protected from dust and so forth.

If the result of the decision at step S12 is in the affirmative "Y" (Yes), then the control section 58 carries out a second reference position setting operation at step S16.

The second reference position setting operation is an operation of positioning the outer case 18 and the inner case 20 at a second reference position through control of the first driving section 24 and the second driving section 26 by the control section 58.

In particular, the second reference position is a position in which the inner case 20 assumes the conversion lens use position and the optical axis of the image pickup optical system 40 is directed to the front of the base 16. In the present embodiment, the optical axis of the image pickup optical system 40 extends on a plane perpendicular to the first imaginary axis L1.

Incidentally, when the inner case 20 rotationally moves from the conversion lens non-use range to the conversion lens use position, also the optical axis of the image pickup optical system 40 rotates around the second imaginary axis L2.

In the procedure, an image of the ceiling or the sky where no image pickup object exists is temporarily picked up, and accordingly, it is a matter of concern to the user that an unnecessary image other than an image of the image pickup object is displayed on the monitor 12.

In order to prevent such a trouble as just described, in the present embodiment, while the inner case 20 rotationally moves from within the conversion lens non-use range to the conversion lens use position, the control section 58 controls the video signal production section 50 to display a changeover screen on the monitor 12 at step S18.

As such a changeover screen as just mentioned, the entire screen of the monitor 12 may display a uniform color such as, for example, blue, white or black.

Also it is a possible idea to store, at a point of time at which the control section 58 accepts a control instruction to use the conversion lens 28 from the remote controller 14, a currently picked up image into a memory and display the image as the changeover screen image on the monitor 12.

By display of such a changeover screen image as described above, the user need not watch such an unnecessary image as described hereinabove, which is advantageous to achieve improvement of the feeling in use.

Then, when the inner case 20 rotationally moves to the conversion lens use position, the optical axis of the image pickup optical system 40 is brought into alignment with the optical axis of the conversion lens 28 and the zoom ratio of the optical system including the conversion lens 28 and the image pickup optical system 40 is displaced to the wide angle end side or the telephoto end side, in the present embodiment, to the wide angle end side.

The control section 58 controls the first driving section 24 in accordance with a panning direction turning instruction supplied thereto from the remote controller 14 in response to an operation of the joystick 1406. Consequently, the outer case 18 is rotated around the first imaginary axis L1 to carry out a panning operation as seen in FIG. 17 at step S20.

It is to be noted that, while, in the present embodiment, the conversion lens 28 cannot move in a direction around the second imaginary axis L2, since the angle of view of the conversion lens 28 is 180 degrees, the camera apparatus 10 can pick up an image over a wide range without any trouble.

Further, in the present embodiment, where the inner case 20 is positioned at the conversion lens use position, the outer case 18 rotates over a range of 350 degrees around the first imaginary axis L1. More particularly, the outer case 18 rotates over a range of 175 degrees in each of the leftward and rightward directions from the second reference position.

Then, the control section 58 decides whether or not a control instruction not to use the conversion lens 28 is accepted from the remote controller 14 at step S22.

If the result of the decision at step S22 is in the negative "N," then the processing returns to step S20.

However, if the result of the decision at step S22 is in the affirmative "Y," then the control section 58 controls the first driving section 24 and the second driving section 26 to assume the first reference position at which the inner case 20 is positioned in the conversion lens non-use range and the optical axis of the image pickup optical system 40 is directed forwardly of the base 16 at step S24 as similarly as at step S10.

Thereupon, when the inner case 20 rotationally moves from the conversion lens use position into the conversion lens non-use range, also the optical axis of the image pickup optical system 40 rotates around the second imaginary axis L2.

In the procedure, an image of the ceiling or the sky where no image pickup object exists is temporarily picked up, and accordingly, it is a matter of concern to the user that an unnecessary image other than an image of the image pickup object is displayed on the monitor 12.

Accordingly, similarly as at step S18, while the inner case 20 rotationally moves from the conversion lens use position into the conversion lens non-use range, the control section 58 controls the video signal production section 50 to display a changeover screen on the monitor 12 at step S26.

By display of such a changeover screen image as described above, the user need not watch such an unnecessary image as described hereinabove, which is advantageous to achieve improvement of the feeling in use.

Then, the processing returns to step S14 to execute similar operation.

It is to be noted that, in the present embodiment, the video signal production section 50 and the control section 58 construct changeover image signal production means for producing a video signal for causing a changeover screen image to be displayed on the monitor 12 while the inner case 20 rotationally moves between the conversion lens use position and the conversion lens non-use range.

As described above, in the camera apparatus 10 of the present embodiment, by rotating the inner case 20 to the conversion lens use position at which the optical axis of the image pickup optical system 40 is aligned with the optical axis of the conversion lens 28, image pickup using the conversion lens 28 can be carried out.

Further, by rotating the inner case 20 into the conversion lens non-use range wherein the optical path of the image pickup optical system 40 is displaced from the conversion lens 28, image pickup only using the image pickup optical system 40 can be carried out.

Therefore, image pickup of the optical system which includes the conversion lens in addition to the image pickup optical system can be carried out by controlling the first and second driving sections 24 and 26, and this is advantageous to achieve improvement of the operability in comparison with an alternative case wherein the conversion lens is mounted by a manual operation as in the existing art.

Further, since only one image pickup optical system is demanded and besides also only one signal processing section for a picked up image signal is demanded in comparison with an alternative case wherein two image pickup optical systems are provided as in the existing art, the camera apparatus is advantageous to achieve miniaturization, simplification and reduction in cost thereof.

Accordingly, a high zoom ratio can be implemented with a simple configuration, and a camera apparatus superior in convenience in use can be provided advantageously.

Further, in the present embodiment, since the conversion lens 28 is fixed to the outer case 18, reduction of the driving force of the first and second driving sections 24 and 26 for driving the outer case 18 and the inner case 20 can be achieved, which is advantageous to achieve saving of the energy. Further, in comparison with an alternative configuration wherein the conversion lens is attached forwardly of the image pickup optical system 40 as in the existing art, the present embodiment can eliminate following necessities. That is, the necessity is to add a part for balancing on the rear side with respect to the second imaginary axis L2 in the inside of the inner case 20 on the opposite side to the image pickup optical system 40 taking the difference between the weight when the conversion lens is attached and the weight when the conversion lens is not attached into consideration. In addition, the necessity is to design the first and second driving sections 24 and 26 taking a dispersion in accuracy of the stopping position by fluctuation of the center of gravity into consideration. This is advantageous to assure the degree of freedom in design.

(Second Embodiment)

Now, a second embodiment of the present invention is described.

The camera apparatus 10 of the second embodiment is different from that of the first embodiment in that it includes a plurality of conversion lenses 28.

Figure 19:
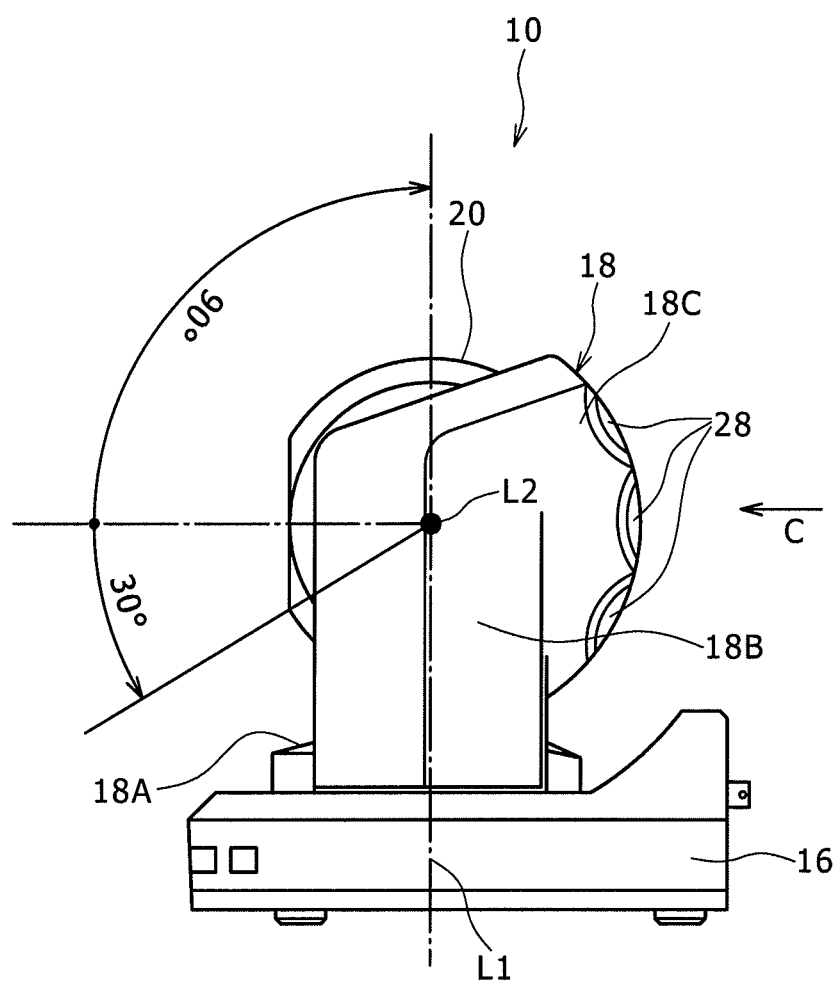
FIG. 19 is a side elevational view of a camera apparatus according to a second embodiment of the present invention.
Figure 20:
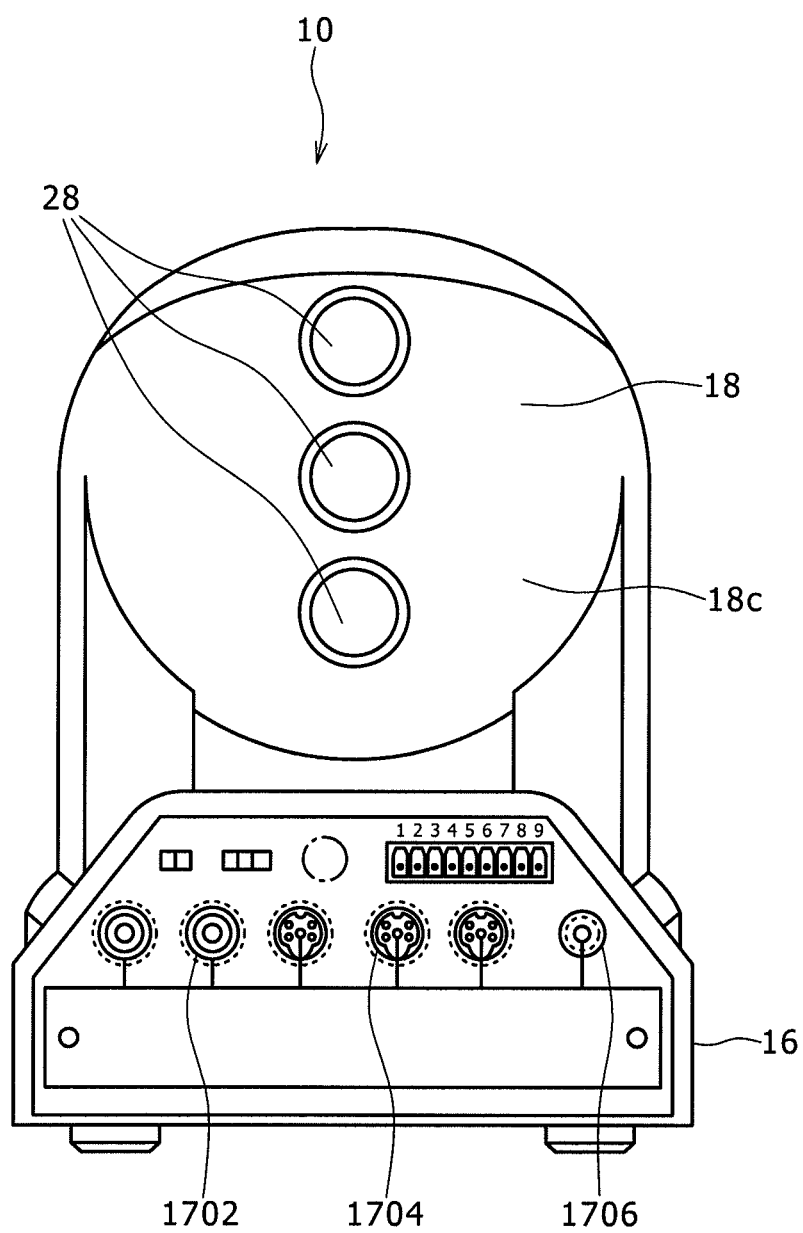
FIG. 20 is a view as viewed in the direction indicated by an arrow mark C of FIG. 19.

Referring to FIGS. 19 and 20, the conversion lenses 28 are secured to the outer case 18.

Actually, a plurality of, three in the embodiment shown, conversion lenses 28 are provided in a spaced relationship from each other in the direction of rotation of the inner case 20 on the outer case 18.

Accordingly, the inner case 20 has a plurality of conversion lens use positions at each of which the optical axis of the image pickup optical system 40 and the optical axis of the conversion lens 28 are aligned with each other.

With the camera apparatus 10 of the second embodiment, not only similar effects to those of the camera apparatus 10 of the first embodiment are achieved, but also the directions of the optical axes of the conversion lenses 28 can be made different from each other around the second imaginary axis L2, which is advantageous to expand the range of image pickup in a direction around the second imaginary axis L2.

Accordingly, where a conversion lens having an angle of view smaller than 180 degrees is adopted for the conversion lens 28, the range of image pickup in the direction around the second imaginary axis L2 can be expanded more advantageously. It is to be noted that, the number of the conversion lens 28 may be two or four or more.

(Third Embodiment)

Now, a third embodiment of the present invention is described.

The camera apparatus 10 of the third embodiment is different from that of the first embodiment in that the conversion lens 28 is movable.

Figure 21:
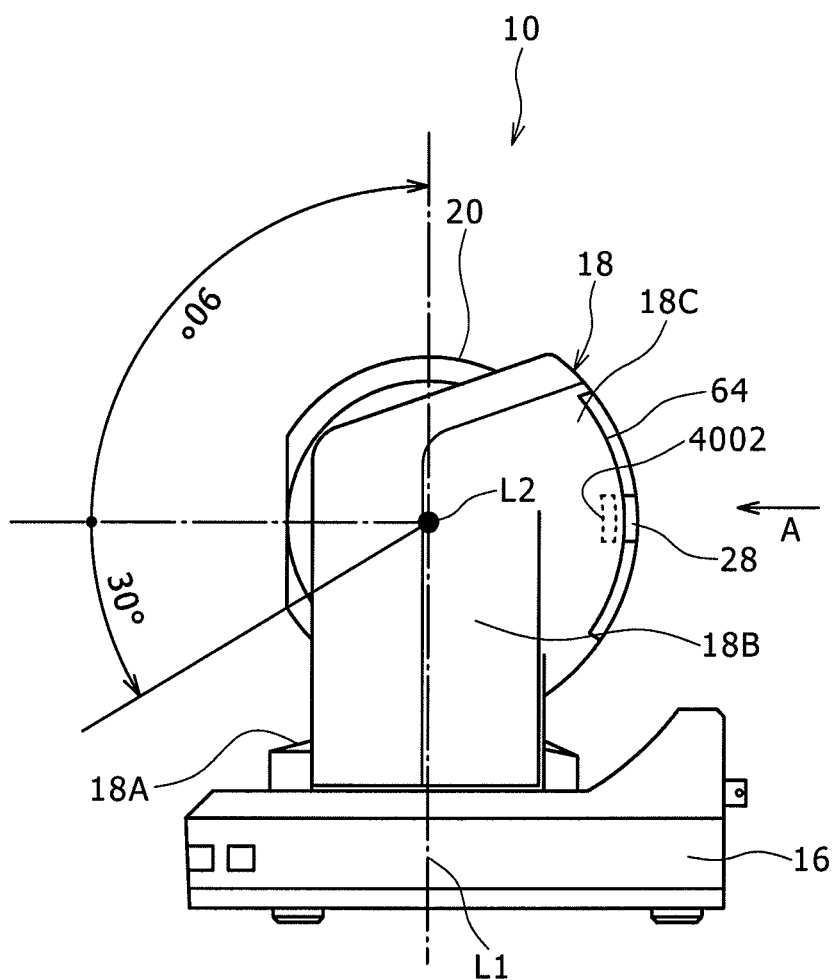
FIG. 21 is a side elevational view of a camera apparatus according to a third embodiment of the present invention.
Figure 22:
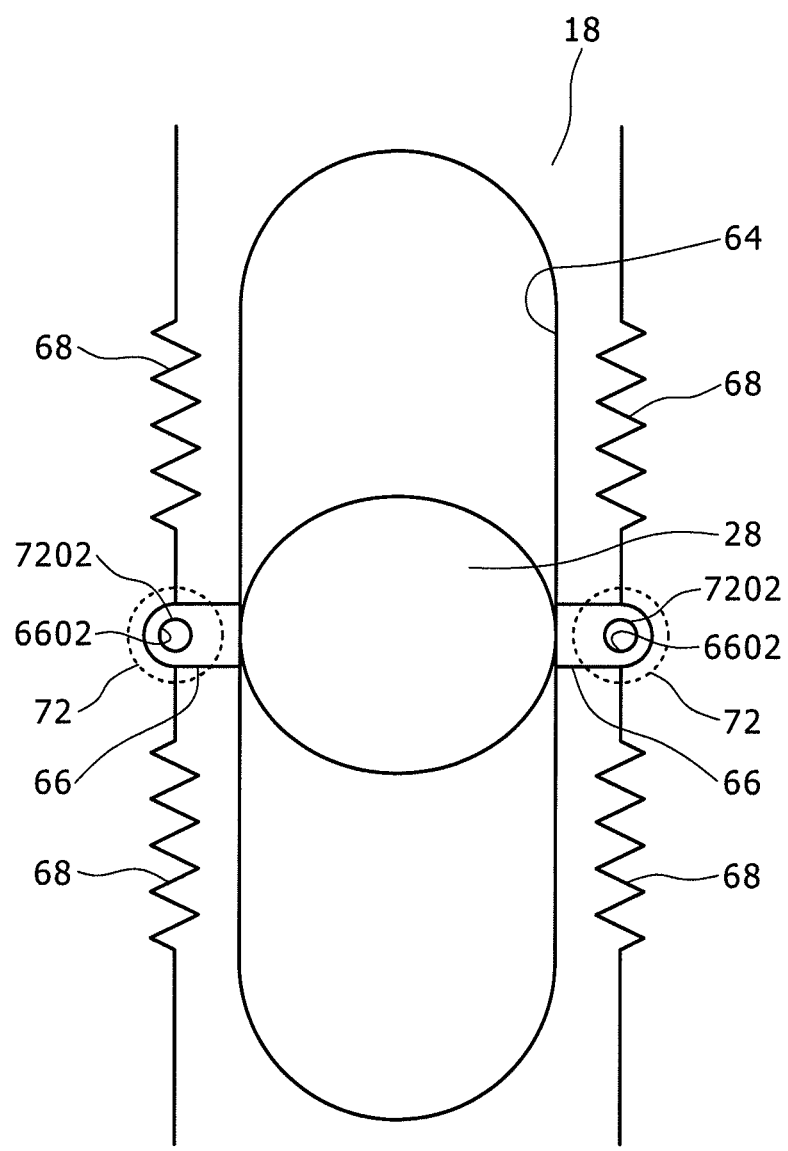
FIG. 22 is a view as viewed in the direction indicated by an arrow mark A of FIG. 21.

Referring to FIGS. 21 and 22, an elongated groove 64 is formed in the direction of rotation of the inner case 20 in the outer case 18.

The conversion lens 28 is supported for movement along the elongated groove 64 in the elongated groove 64 on the outer case 18.

A pair of flanges 66 are provided on the opposite side portions of the conversion lens 28.

When the inner case 20 is positioned at the conversion lens use position, the conversion lens 28 is positioned at an initial position at which the optical axis thereof is positioned on the optical axis of the image pickup optical system 40.

A pair of biasing members 68 extend between the flanges 66 and the outer case 18 to normally bias the conversion lens 28 to the initial position.

A pair of engaging sections 70 are provided for engaging with the inner case 20 and the conversion lens 28 with each other in a state wherein the inner case 20 is positioned at the conversion lens use position and the conversion lens 28 is positioned at the initial position so that the inner case 20 and the conversion lens 28 can rotate integrally with each other.

Each of the engaging sections 70 includes a solenoid 72 which is an electric actuator.

The solenoid 72 is attached to the inner case 20 and has a pin 7202 which projects, in a state wherein the inner case 20 is positioned at the conversion lens use position and the conversion lens 28 is positioned at the initial position, to engage with a hole 6602 of the corresponding flange 66.

In particular, by causing the solenoids 72 to operate in the state wherein the inner case 20 is positioned at the conversion lens use position and the conversion lens 28 is positioned at the initial position, the inner case 20 and the conversion lens 28 are engaged with each other for integral rotation by the pins 7202.

Then, in this state, by rotating the inner case 20, the direction of the optical axis of the conversion lens 28 can be varied around the second imaginary axis L2 similarly as in the second embodiment.

The third embodiment is different from the second embodiment in that the direction of the optical axis of the conversion lens 28 can be varied continuously.

It is to be noted that, if the pins 7202 are removed from the holes 6602 of the flanges 66 by operation of the solenoids 72, then the conversion lens 28 returns to the initial position by action of the biasing members 68.

Accordingly, where a conversion lens having an angle of view smaller than 180 degrees is adopted for the conversion lens 28, the range of image pickup in the direction around the second imaginary axis L2 can be expanded more advantageously.

Particularly where the conversion lens 28 is a tele conversion lens which varies the focal distance of the optical system including the conversion lens 28 in addition to the image pickup optical system 40 to the telephoto end side, the range of image pickup in the direction around the second imaginary axis L2 can be expanded advantageously.

(Fourth Embodiment)

Now, a fourth embodiment of the present invention is described.

The camera apparatus 10 of the fourth embodiment uses a shutter for protecting the conversion lens 28.

Figure 23:
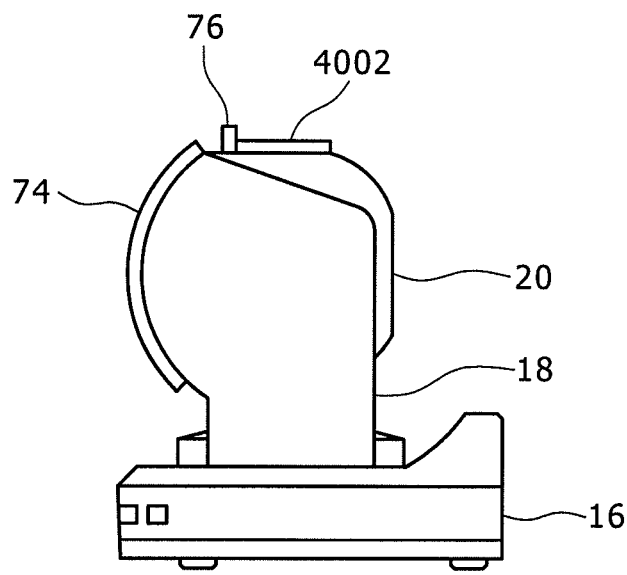
FIG. 23 is a side elevational view of a camera apparatus according to a fourth embodiment of the present invention where a shutter is in a closed state.
Figure 24:
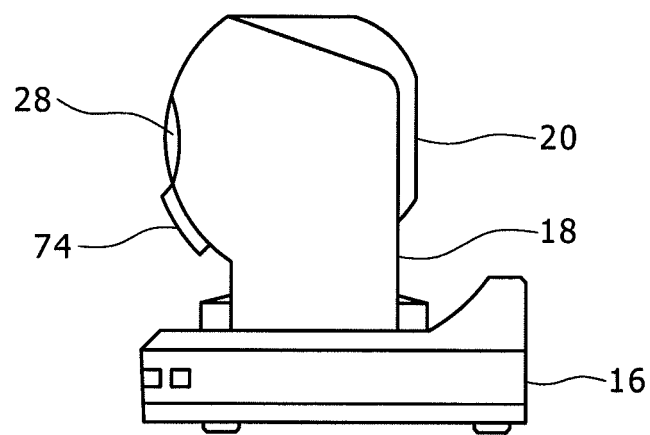
FIG. 24 is a similar view but showing the camera apparatus shown in FIG. 23 where the shutter is in an open state.

Referring to FIGS. 23 and 24, the outer case 18 includes a shutter 74 for covering the conversion lens 28.

The shutter 74 may be formed using any of various existing known members such as, for example, a member formed from a plurality of plate members connected for sliding movement relative to each other or a member in the form of a bellows.

As shown in FIG. 23, the shutter 74 assumes a close state wherein it covers the conversion lens 28 in a state wherein it is developed in the direction of rotation of the inner case 20.

The shutter 74 is attached at a lower end thereof to the outer case 18 and is biased at an upper end thereof toward the close state by a biasing member not shown.

When the inner case 20 rotates from the conversion lens non-use range to the conversion lens use position, an upper end of the shutter 74 is engaged with a projection 76 in the inner case 20 so that the shutter 74 is placed into an open state and the conversion lens 28 is uncovered by the inner case 20.

With the configuration described above, upon use of the conversion lens 28, it can be used without any trouble, but when the conversion lens 28 is not used, it can be protected from dust and so forth.

(Fifth Embodiment)

Now, a fifth embodiment of the present invention is described.

In the fifth embodiment, the camera apparatus 10 is remotely controlled by a touch panel. In particular, an image picked up by the camera apparatus 10 is displayed on the monitor 12, and the image displayed on the monitor 12 is touched with a finger or a touch pen to cause the camera apparatus 10 to carry out a zooming up operation.

Figure 25:
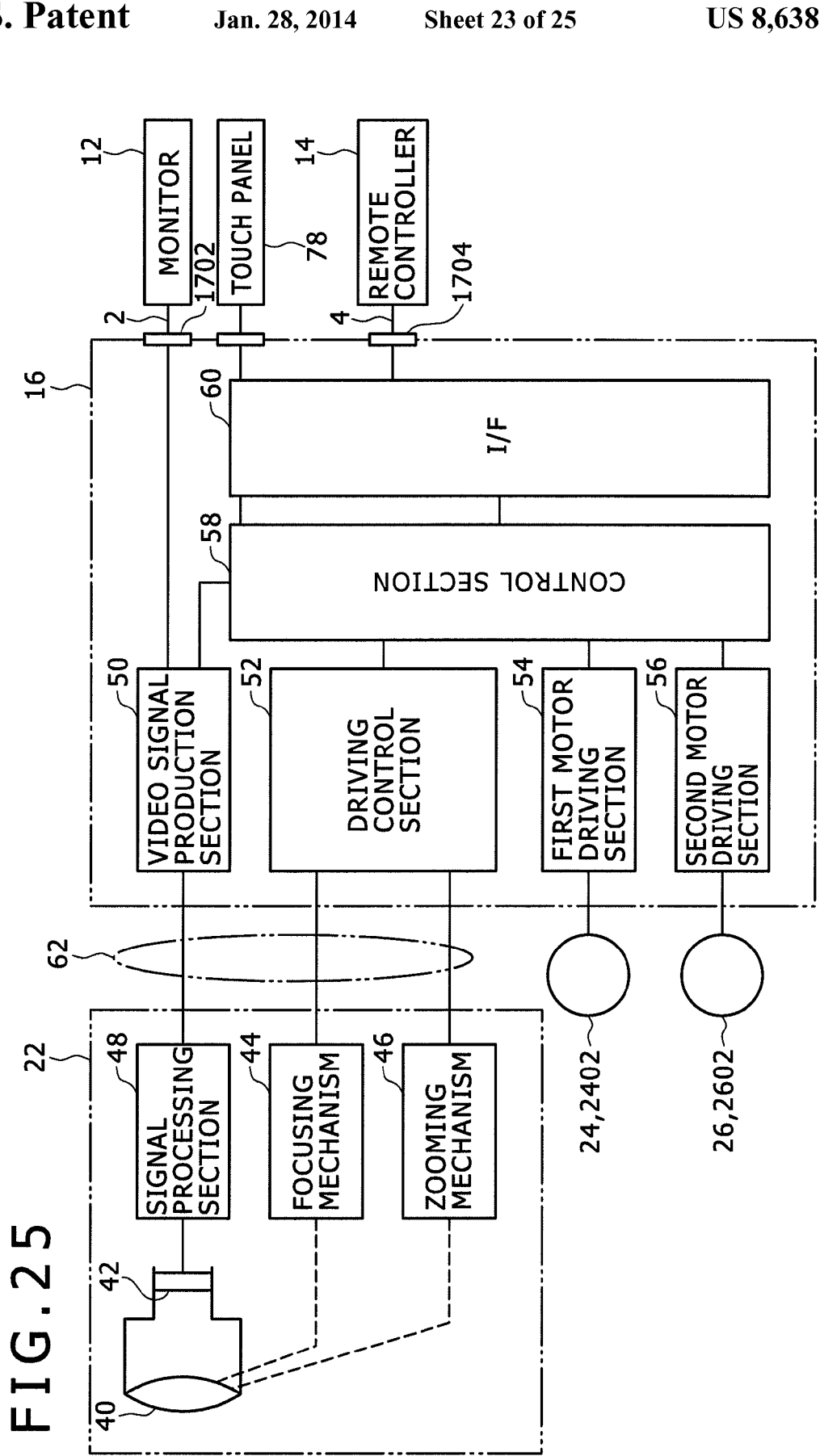
FIG. 25 is a block diagram showing a configuration of a camera apparatus according to a fifth embodiment of the present invention.
Figure 26A:
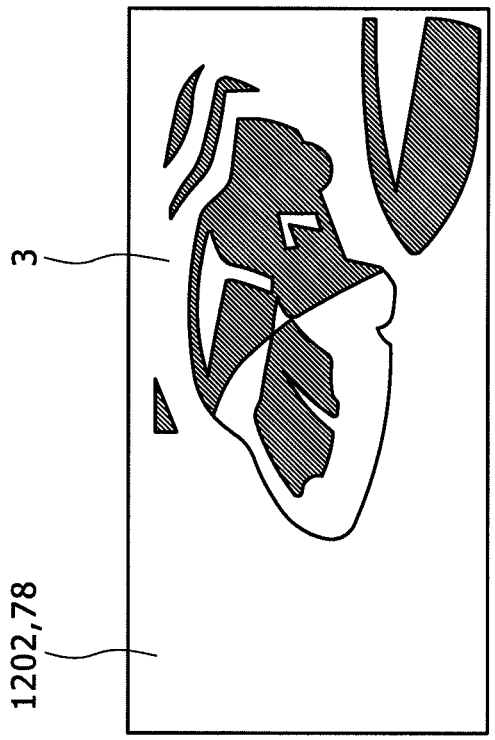
Figure 26B:
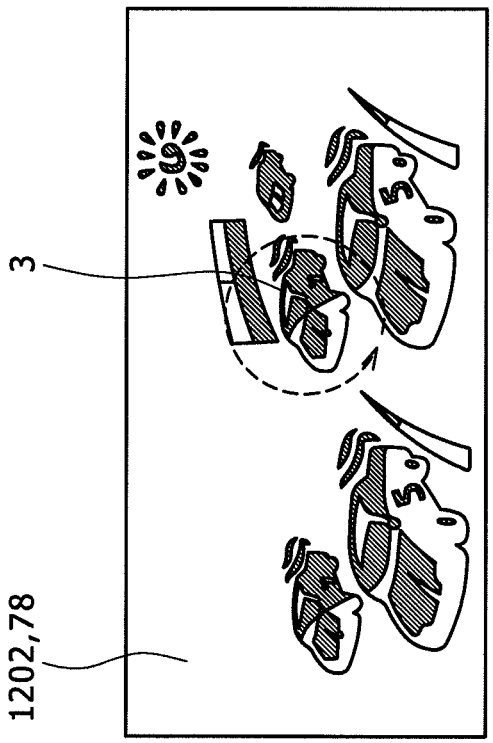

Referring to FIGS. 25, 26A and 26B, in the fifth embodiment, a touch panel 78 is provided in such a manner as to cover the display screen 1202 of the monitor 12.

The touch panel 78 produces, when the surface thereof is touched with a finger or a touch pen, a detection signal representative of a position or a region on the display screen 1202 and supplies the detection signal to the control section 58 through the interface 60.

The control section 58 specifies and recognizes the position or region designated on the display screen 1202 of the monitor 12 in accordance with a video signal supplied from the video signal production section 50 to the monitor 12 and a detection signal supplied from the touch panel 78.

First, a case wherein the image pickup optical system 40 is an optical system which can carry out a zoom operation and the conversion lens 28 is a wide conversion lens is described.

It is assumed that an image of a wide region is picked up using the conversion lens 28 and a plurality of image pickup objects 3 are displayed on the display screen 1202 as shown in FIG. 26A.

In this instance, the touch panel 78 is traced using a touch pen such that the portion or region of an image pickup object 3 selected from among the image pickup objects 3 is surrounded.

Consequently, the control section 58 controls and drives the first and second driving sections 24 and 26 in accordance with the detection signal of the touch panel 78 to move the inner case 20 into the conversion lens non-use range and direct the optical axis of the image pickup optical system 40 toward the selected image pickup object 3. Then, the focusing mechanism 44 and the zooming mechanism 46 are controlled to zoom up the image pickup object 3 solely through the image pickup optical system 40.

Consequently, the image pickup object 3 is displayed in an enlarged scale at the center of the display screen 1202 as seen in FIG. 26B.

Now, another case is described wherein the image pickup optical system 40 is an optical system which can carry out a zooming operation while the conversion lens 28 is a tele conversion lens and is configured for movement together with the inner case 20 as in the third embodiment.

It is assumed that an image of an image pickup object 3 picked up solely by the image pickup optical system 40 is displayed on the display screen 1202 as shown in FIG. 27A.

In this instance, the touch panel 78 is traced with a touch pen such that a particular portion or region 4 from within the image pickup object 3 is surrounded.

Consequently, the control section 58 controls and drives the first and second driving sections 24 and 26 in accordance with a detection signal of the touch panel 78 to move the inner case 20 to the conversion lens use position and direct the optical axis of the image pickup optical system 40 toward the selected portion 4. Then, the control section 58 controls the focusing mechanism 44 and the zooming mechanism 46 to zoom up the selected image pickup object 3 using only the image pickup optical system 40.

Consequently, the selected portion 4 is displayed in an enlarged scale at the center of the display screen 1202 as seen in FIG. 27B.

In other words, the control section 58 configures zoom up means for causing, when a detection signal which specifies a position or a region of an image displayed on the display screen 1202 as a result of operation of the touch panel 78 provided on the display screen 1202 of the monitor 12 is produced by the touch panel 78, an image of an image pickup object corresponding to the specified position or region of the image to be picked up in an enlarged scale using the image pickup optical system 40 or using the image pickup optical system 40 and the conversion lens 28.

The zoom up means controls the first driving section 24 and the second driving section 26 in accordance with a detection signal to position the inner case 20 to the conversion lens use position or the conversion lens non-use range.

With the camera apparatus 10 of the present embodiment, a desired image pickup object 3 or a desired portion 4 of an image pickup object 3 can be displayed in a zoomed up state, that is, in an enlarged state, by simple operation, and this is advantageous to enhance the convenience in use.

The present application contains subject matter related to that disclosed in Japanese Priority Patent Application JP 2008-238992 filed with the Japan Patent Office on Sep. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus, comprising:
   a base;
   an outer case for rotation around a first imaginary axis which passes said base;
   an inner case provided on said outer case for rotation around a second imaginary axis extending on a plane intersecting with the first imaginary axis;
   a camera section incorporated in said inner case and having an image pickup optical system;
   a first driving section for rotating said outer case;
   a second driving section for rotating said inner ease;
   a control section for controlling the first driving section and the second driving section;
   a conversion lens supported on said outer case; and
   changeover video signal production means for producing a video signal for causing a monitor to display a changeover screen image in response to the control section controlling the second driving section to move said inner case rotationally between a conversion lens use position and a conversion lens non-use range,
   said inner case being rotated by said second driving section between the conversion lens use position at which an optical axis of said image pickup optical system is aligned with an optical axis of said conversion lens and the conversion lens non-use range within which an optical path of said image pickup optical system is displaced from said conversion lens.

2. The camera apparatus according to claim 1, wherein a plurality of such conversion lenses are provided in a spaced relationship from each other in the direction of rotation of said inner case on said outer case.

3. The camera apparatus according to claim 1, wherein said conversion lens is supported for movement in the direction of rotation of said inner case on said outer case and is positioned, when said inner case is positioned at the conversion lens use position, at an initial position at which the optical axis of said conversion lens is positioned on the optical axis of said image pickup optical system;

said camera apparatus further comprising:

a biasing member for biasing said conversion lens to the initial position; and an engaging section for engaging said inner case and said conversion lens with each other for integral rotation in a state wherein said inner case is positioned at the conversion lens use position and said conversion lens is positioned at the initial position.

4. The camera apparatus according to claim 3, wherein said engaging section includes an electric actuator.

5. The camera apparatus according to claim 1, further comprising:

a shutter provided on said outer case for covering said conversion lens; and a biasing member for biasing said shutter to a closing state in which said shutter covers said conversion lens;

said shutter being engaged, when said inner case rotates from the conversion lens non-use range to the conversion lens use position, with said inner case so that said shutter is placed into an open state wherein said conversion lens is uncovered by said inner case.

6. The camera apparatus according to claim 1, wherein said image pickup optical system includes a zooming mechanism including a zoom lens which is moved to continuously vary the magnification of an image of an image pickup object.

7. The camera apparatus according to claim 1, further comprising:

an image pickup element for picking up an image of an image pickup object introduced by said image pickup optical system; and a video signal production section for producing a video signal based on the picked up image signal supplied from said image pickup element and supplying the video signal to a monitor so that an image is displayed on the monitor.

8. The camera apparatus according to claim 1, further comprising:

an image pickup element for picking up an image of an image pickup object introduced by said image pickup optical system;

a video signal production section for producing a video signal based on the picked up image signal supplied from said image pickup element and supplying the video signal to a monitor so that an image is displayed on the monitor; and zoom up means operable when a detection signal which specifies a position or a region of an image displayed on a display screen of the monitor in response to an operation of a touch panel provided on the display screen of the monitor is produced by the touch panel for causing an image pickup object corresponding to the specified position or region of the image to be displayed in an enlarged relationship through said image pickup optical system or through said image pickup optical system and said conversion lens;

said zoom up means controlling said first driving section and said second driving section in response to the detection signal to position the inner case at the conversion lens use position or the conversion lens non-use range.

* * * * *